US011082355B2

(12) United States Patent
Marshall et al.

(10) Patent No.: US 11,082,355 B2
(45) Date of Patent: *Aug. 3, 2021

(54) CONTROLLNG DISTRIBUTION OF RESOURCES IN A NETWORK

(71) Applicant: AirWatch LLC, Atlanta, GA (US)

(72) Inventors: John Marshall, Atlanta, GA (US); Adam Rykowski, Atlanta, GA (US); Erich Stuntebeck, Johns Creek, GA (US); Jyothiprakash Halebeed, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 641 days.

This patent is subject to a terminal disclaimer.

(21) Appl. No.: 15/597,435

(22) Filed: May 17, 2017

(65) Prior Publication Data

US 2017/0279731 A1    Sep. 28, 2017

Related U.S. Application Data

(63) Continuation of application No. 13/396,356, filed on Feb. 14, 2012, now Pat. No. 9,680,763.

(51) Int. Cl.
*H04L 12/911* (2013.01)
*G06F 21/31* (2013.01)
*G06F 21/62* (2013.01)
*H04L 29/06* (2006.01)

(52) U.S. Cl.
CPC .............. *H04L 47/70* (2013.01); *G06F 21/31* (2013.01); *G06F 21/6218* (2013.01); *H04L 63/102* (2013.01)

(58) Field of Classification Search
CPC ... H04L 47/70; H04L 63/102; G06F 21/6218; G06F 21/31
See application file for complete search history.

(56) References Cited

U.S. PATENT DOCUMENTS

| 4,679,226 A | 7/1987 | Muehleisen |
| 5,237,614 A | 8/1993 | Weiss |
| 5,446,888 A | 8/1995 | Pyne |
| 5,574,786 A | 11/1996 | Dayan et al. |
| 5,625,869 A | 4/1997 | Nagamatsu et al. |

(Continued)

FOREIGN PATENT DOCUMENTS

| CA | 2149337 | 6/1994 |
| EP | 2675137 | 12/2013 |

(Continued)

OTHER PUBLICATIONS

European Search Report dated Feb. 9, 2018 for Application No. 17201693.3-1218.

(Continued)

*Primary Examiner* — Abdullahi E Salad
(74) *Attorney, Agent, or Firm* — Thomas Horstemeyer, LLP

(57) ABSTRACT

Disclosed are various embodiments for accessing resources when a client device complies with distribution rules. A client device receives selected resources and distribution rules associated with the resources. The client device determines whether the client device complies with the distribution rules. When the resources are modified, the changes are sent to a distribution service associated with the resources.

20 Claims, 10 Drawing Sheets

(56) References Cited

U.S. PATENT DOCUMENTS

| | | |
|---|---|---|
| 5,631,947 A | 5/1997 | Wittstein et al. |
| 5,740,395 A | 4/1998 | Wells et al. |
| 5,799,068 A | 8/1998 | Kikinis et al. |
| 5,826,265 A | 10/1998 | Van et al. |
| 5,864,683 A | 1/1999 | Boebert et al. |
| 5,870,459 A | 2/1999 | Phillips et al. |
| 5,928,329 A | 7/1999 | Clark et al. |
| 5,961,590 A | 10/1999 | Mendez et al. |
| 5,966,081 A | 10/1999 | Chesnutt |
| 5,974,238 A | 10/1999 | Chase |
| 5,987,609 A | 11/1999 | Hasebe |
| 6,021,492 A | 2/2000 | May |
| 6,023,708 A | 2/2000 | Mendez et al. |
| 6,078,260 A | 6/2000 | Desch |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,167,253 A | 12/2000 | Farris et al. |
| 6,233,341 B1 | 5/2001 | Riggins |
| 6,269,369 B1 | 7/2001 | Robertson |
| 6,286,098 B1 | 9/2001 | Wenig et al. |
| 6,370,629 B1 | 4/2002 | Hastings et al. |
| 6,463,470 B1 | 10/2002 | Mohaban et al. |
| 6,480,096 B1 | 11/2002 | Gutman et al. |
| 6,529,949 B1 | 3/2003 | Getsin et al. |
| 6,560,772 B1 | 5/2003 | Slinger |
| 6,578,069 B1 * | 6/2003 | Hopmann ......... G06F 17/30876 707/999.201 |
| 6,606,662 B2 | 8/2003 | Nagasaki |
| 6,636,489 B1 | 10/2003 | Fingerhut |
| 6,668,322 B1 | 12/2003 | Wood et al. |
| 6,694,335 B1 * | 2/2004 | Hopmann ......... G06F 17/30581 707/624 |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,017,105 B2 | 3/2006 | Flanagin et al. |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,107,339 B1 | 9/2006 | Wolters |
| 7,184,801 B2 | 2/2007 | Farcasiu |
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,350,229 B1 | 3/2008 | Lander |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,398,393 B2 | 7/2008 | Mont et al. |
| 7,430,757 B1 | 9/2008 | Chari et al. |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,448,023 B2 | 11/2008 | Chory et al. |
| 7,475,152 B2 | 1/2009 | Chan et al. |
| 7,480,907 B1 | 1/2009 | Marolia et al. |
| 7,496,847 B2 | 2/2009 | Koehane et al. |
| 7,496,957 B2 | 2/2009 | Howard et al. |
| 7,539,665 B2 | 5/2009 | Mendez |
| 7,543,146 B1 | 6/2009 | Karandikar et al. |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,657,746 B2 | 2/2010 | Paramasivam et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,769,394 B1 | 8/2010 | Zhu |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,865,469 B2 * | 1/2011 | Hopmann ......... G06F 17/30578 707/638 |
| 7,873,959 B2 | 1/2011 | Zhu et al. |
| 7,890,091 B2 | 2/2011 | Puskoor et al. |
| 7,895,296 B1 | 2/2011 | Dayan |
| 7,912,896 B2 | 3/2011 | Wolovitz et al. |
| 7,917,641 B2 | 3/2011 | Crampton |
| 7,921,155 B2 | 4/2011 | Harrow et al. |
| 7,970,386 B2 | 6/2011 | Bhat et al. |
| 7,991,697 B2 | 8/2011 | Fransdonk |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,051,491 B1 | 11/2011 | Cavage et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,095,124 B2 | 1/2012 | Balia |
| 8,108,687 B2 | 1/2012 | Ellis et al. |
| 8,117,344 B2 | 2/2012 | Mendez et al. |
| 8,127,133 B2 | 2/2012 | Cross et al. |
| 8,150,431 B2 | 4/2012 | Wolovitz et al. |
| 8,155,587 B2 | 4/2012 | Sasai et al. |
| 8,166,106 B2 | 4/2012 | Biggs et al. |
| 8,201,216 B2 | 6/2012 | Cha et al. |
| 8,214,862 B1 | 7/2012 | Lee et al. |
| 8,225,381 B2 | 7/2012 | Lemke |
| 8,276,209 B2 | 9/2012 | Knibbeler et al. |
| 8,332,350 B2 | 12/2012 | Pulfer et al. |
| 8,353,044 B1 | 1/2013 | Jones et al. |
| 8,407,345 B2 | 3/2013 | Lim |
| 8,411,834 B2 | 4/2013 | Gopinath et al. |
| 8,423,511 B1 | 4/2013 | Bhatia |
| 8,456,293 B1 | 6/2013 | Trundle et al. |
| 8,472,874 B2 | 6/2013 | Tang et al. |
| 8,504,831 B2 | 8/2013 | Pratt et al. |
| 8,601,102 B1 * | 12/2013 | Lee ....................... H04L 67/141 709/223 |
| 8,611,928 B1 | 12/2013 | Bill |
| 8,687,536 B2 | 4/2014 | Michaelis |
| 8,689,281 B2 | 4/2014 | Balinsky et al. |
| 8,769,605 B2 | 7/2014 | Kaufmann et al. |
| 8,843,413 B2 | 9/2014 | Robert et al. |
| 8,875,222 B1 | 10/2014 | Chang et al. |
| 8,933,778 B2 | 1/2015 | Birkel et al. |
| 8,934,841 B2 | 1/2015 | Koh et al. |
| 8,955,038 B2 | 2/2015 | Nicodemus et al. |

(56) References Cited

U.S. PATENT DOCUMENTS

| | | |
|---|---|---|
| 9,167,031 B2 | 10/2015 | Takashima |
| 9,247,014 B1 | 1/2016 | Rao |
| 9,516,066 B2 | 12/2016 | Brannon et al. |
| 9,680,763 B2 | 6/2017 | Marshall et al. |
| 9,705,813 B2 | 7/2017 | Marshall et al. |
| 2001/0047335 A1 | 11/2001 | Arndt et al. |
| 2002/0013721 A1 | 1/2002 | Dabbiere et al. |
| 2002/0049580 A1 | 4/2002 | Kutaragi et al. |
| 2002/0055967 A1 | 5/2002 | Coussement |
| 2002/0098840 A1 | 7/2002 | Hanson et al. |
| 2002/0157019 A1 | 10/2002 | Kadyk et al. |
| 2003/0020623 A1 | 1/2003 | Cao et al. |
| 2003/0065934 A1 | 4/2003 | Angelo et al. |
| 2003/0065950 A1 | 4/2003 | Yarborough |
| 2003/0110084 A1 | 6/2003 | Eberhard et al. |
| 2003/0164853 A1 | 9/2003 | Zhu et al. |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2003/0232616 A1 | 12/2003 | Gidron et al. |
| 2004/0003133 A1 | 1/2004 | Pradhan et al. |
| 2004/0008113 A1 | 1/2004 | Pradhan et al. |
| 2004/0019626 A1 | 1/2004 | Shepherd |
| 2004/0064713 A1 | 4/2004 | Yadav |
| 2004/0098715 A1 | 5/2004 | Aghera et al. |
| 2004/0123153 A1 | 6/2004 | Wright et al. |
| 2004/0167984 A1 | 8/2004 | Herrmann |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0005113 A1 | 1/2005 | Dillon et al. |
| 2005/0071748 A1 | 3/2005 | Shipp |
| 2005/0097032 A1 | 5/2005 | Benco et al. |
| 2005/0097327 A1 | 5/2005 | Ondet et al. |
| 2005/0181808 A1 | 8/2005 | Vaudreuil |
| 2005/0198029 A1 | 9/2005 | Pohja et al. |
| 2005/0246192 A1 | 11/2005 | Jauffred et al. |
| 2005/0272445 A1 | 12/2005 | Zellner |
| 2005/0283614 A1 | 12/2005 | Hardt |
| 2006/0013566 A1 | 1/2006 | Nakamura |
| 2006/0059100 A1 | 3/2006 | Ronning et al. |
| 2006/0067250 A1 | 3/2006 | Boyer et al. |
| 2006/0130139 A1 | 6/2006 | Sobel et al. |
| 2006/0149846 A1 | 7/2006 | Schuba |
| 2006/0190984 A1 | 8/2006 | Heard et al. |
| 2006/0234793 A1 | 10/2006 | Walker et al. |
| 2007/0033397 A1 | 2/2007 | Phillips et al. |
| 2007/0053306 A1 | 3/2007 | Stevens |
| 2007/0093243 A1 | 4/2007 | Kapadekar et al. |
| 2007/0130473 A1 | 6/2007 | Mazotas |
| 2007/0136492 A1 | 6/2007 | Blum et al. |
| 2007/0136579 A1 | 6/2007 | Levy |
| 2007/0143603 A1 | 6/2007 | Hadden et al. |
| 2007/0156897 A1 | 7/2007 | Lim |
| 2007/0162417 A1 | 7/2007 | Cozianu et al. |
| 2007/0174433 A1 | 7/2007 | Mendez et al. |
| 2007/0189303 A1 | 8/2007 | Sunada |
| 2007/0192484 A1* | 8/2007 | Yamaoka ............... H04L 63/08 709/225 |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2007/0300070 A1 | 12/2007 | Shen-Orr et al. |
| 2008/0010689 A1 | 1/2008 | Ooi et al. |
| 2008/0014947 A1 | 1/2008 | Carnall |
| 2008/0065727 A1 | 3/2008 | Majors et al. |
| 2008/0070593 A1 | 3/2008 | Altman et al. |
| 2008/0072276 A1 | 3/2008 | Pouliot |
| 2008/0125102 A1 | 5/2008 | Abel et al. |
| 2008/0133712 A1 | 6/2008 | Friedman et al. |
| 2008/0134296 A1 | 6/2008 | Amitai et al. |
| 2008/0134305 A1 | 6/2008 | Hinton et al. |
| 2008/0134347 A1 | 6/2008 | Goyal et al. |
| 2008/0160984 A1 | 7/2008 | Benes et al. |
| 2008/0201453 A1 | 8/2008 | Assenmacher |
| 2008/0228504 A1 | 9/2008 | Nguyen et al. |
| 2008/0268895 A1 | 10/2008 | Foxenland |
| 2008/0291897 A1 | 11/2008 | Sourani |
| 2008/0301057 A1 | 12/2008 | Oren |
| 2008/0307219 A1 | 12/2008 | Karandikar |
| 2008/0318548 A1 | 12/2008 | Bravo et al. |
| 2009/0036111 A1 | 2/2009 | Danford et al. |
| 2009/0049157 A1 | 2/2009 | Kimura |
| 2009/0061890 A1 | 3/2009 | Andreasson et al. |
| 2009/0080650 A1 | 3/2009 | Selgas et al. |
| 2009/0086964 A1 | 4/2009 | Agrawal et al. |
| 2009/0089565 A1 | 4/2009 | Buchanan et al. |
| 2009/0138937 A1 | 5/2009 | Erlingsson et al. |
| 2009/0144632 A1 | 6/2009 | Mendez |
| 2009/0186633 A1 | 7/2009 | Yonker et al. |
| 2009/0198997 A1 | 8/2009 | Yeap et al. |
| 2009/0203375 A1 | 8/2009 | Gisby et al. |
| 2009/0222880 A1 | 9/2009 | Mayer et al. |
| 2009/0249440 A1 | 10/2009 | Platt et al. |
| 2009/0260064 A1 | 10/2009 | McDowell et al. |
| 2009/0287921 A1 | 11/2009 | Zhu et al. |
| 2009/0298514 A1 | 12/2009 | Ullah |
| 2009/0300739 A1 | 12/2009 | Nice et al. |
| 2009/0307362 A1 | 12/2009 | Mendez et al. |
| 2009/0327908 A1 | 12/2009 | Hayton |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0064354 A1 | 3/2010 | Irvine |
| 2010/0083359 A1 | 4/2010 | Readshaw et al. |
| 2010/0087144 A1 | 4/2010 | Korenshtein |
| 2010/0091711 A1 | 4/2010 | Sawai |
| 2010/0094981 A1 | 4/2010 | Cordray et al. |
| 2010/0100641 A1 | 4/2010 | Quinlan et al. |
| 2010/0100972 A1 | 4/2010 | Lemieux et al. |
| 2010/0107238 A1 | 4/2010 | Stedman et al. |
| 2010/0120450 A1 | 5/2010 | Herz |
| 2010/0131527 A1 | 5/2010 | Wohlert |
| 2010/0131844 A1 | 5/2010 | Wohlert |
| 2010/0138667 A1 | 6/2010 | Adams et al. |
| 2010/0144323 A1 | 6/2010 | Collins et al. |
| 2010/0146269 A1 | 6/2010 | Baskaran |
| 2010/0150342 A1 | 6/2010 | Richards |
| 2010/0191837 A1 | 7/2010 | Linden et al. |
| 2010/0212016 A1 | 8/2010 | Dubhashi et al. |
| 2010/0222645 A1 | 9/2010 | Nadler et al. |
| 2010/0254410 A1 | 10/2010 | Collins |
| 2010/0257421 A1 | 10/2010 | Kohno et al. |
| 2010/0262828 A1 | 10/2010 | Brown et al. |
| 2010/0262829 A1 | 10/2010 | Brown et al. |
| 2010/0268844 A1 | 10/2010 | Quinlan et al. |
| 2010/0273456 A1 | 10/2010 | Wolovitz et al. |
| 2010/0274910 A1 | 10/2010 | Ghanaie-Sichanie |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0317371 A1 | 12/2010 | Westerinen et al. |
| 2010/0318701 A1 | 12/2010 | Srinivansan et al. |
| 2010/0325710 A1 | 12/2010 | Etchegoyen |
| 2011/0004941 A1 | 1/2011 | Mendez et al. |
| 2011/0039506 A1 | 2/2011 | Lindahl et al. |
| 2011/0055891 A1 | 3/2011 | Rice |
| 2011/0082900 A1 | 4/2011 | Nagpal et al. |
| 2011/0113062 A1 | 5/2011 | Quinlan et al. |
| 2011/0113094 A1 | 5/2011 | Rathod |
| 2011/0135083 A1 | 6/2011 | Lingafelt et al. |
| 2011/0136510 A1 | 6/2011 | Peterson et al. |
| 2011/0141276 A1 | 6/2011 | Borghei |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0165861 A1 | 7/2011 | Wilson et al. |
| 2011/0167474 A1 | 7/2011 | Sinha et al. |
| 2011/0202589 A1 | 8/2011 | Piernot et al. |
| 2011/0202987 A1 | 8/2011 | Bauer-Hermann et al. |

(56) References Cited

U.S. PATENT DOCUMENTS

| | | |
|---|---|---|
| 2011/0225252 A1 | 9/2011 | Bhat et al. |
| 2011/0270799 A1 | 11/2011 | Muratov |
| 2011/0271113 A1 | 11/2011 | Venters, III et al. |
| 2011/0276805 A1 | 11/2011 | Nagpal et al. |
| 2011/0277013 A1 | 11/2011 | Chinta |
| 2011/0296186 A1 | 12/2011 | Wong et al. |
| 2011/0320552 A1 | 12/2011 | Friedman et al. |
| 2011/0320819 A1 | 12/2011 | Weber et al. |
| 2012/0005578 A1 | 1/2012 | Hawkins |
| 2012/0011007 A1 | 1/2012 | Blewett et al. |
| 2012/0015644 A1 | 1/2012 | Danford et al. |
| 2012/0054385 A1 | 3/2012 | Lim et al. |
| 2012/0094639 A1 | 4/2012 | Carlson et al. |
| 2012/0102392 A1 | 4/2012 | Reesman et al. |
| 2012/0110345 A1 | 5/2012 | Pigeon et al. |
| 2012/0117209 A1 | 5/2012 | Sinha |
| 2012/0124640 A1 | 5/2012 | Bender et al. |
| 2012/0150577 A1 | 6/2012 | Berg et al. |
| 2012/0190386 A1 | 7/2012 | Anderson |
| 2012/0198547 A1 | 8/2012 | Fredette et al. |
| 2012/0204032 A1 | 8/2012 | Wilkins et al. |
| 2012/0246719 A1 | 9/2012 | Bhamidipaty et al. |
| 2012/0252494 A1 | 10/2012 | Parker et al. |
| 2012/0272287 A1 | 10/2012 | Kuhlke et al. |
| 2012/0284322 A1 | 11/2012 | Laborczfalvi et al. |
| 2012/0288091 A1 | 11/2012 | Honke et al. |
| 2012/0289153 A1 | 11/2012 | Dobyns |
| 2012/0290544 A1 | 11/2012 | Abuelsaad et al. |
| 2012/0291104 A1 | 11/2012 | Hasek |
| 2012/0311329 A1 | 12/2012 | Medina et al. |
| 2012/0311686 A1 | 12/2012 | Medina et al. |
| 2012/0331527 A1 | 12/2012 | Walters et al. |
| 2013/0007245 A1 | 1/2013 | Malik et al. |
| 2013/0036459 A1 | 2/2013 | Liberman et al. |
| 2013/0040604 A1 | 2/2013 | Sprigg et al. |
| 2013/0040629 A1 | 2/2013 | Sprigg et al. |
| 2013/0045729 A1 | 2/2013 | Haik |
| 2013/0046971 A1 | 2/2013 | Lu |
| 2013/0055363 A1 | 2/2013 | Dattagupta et al. |
| 2013/0061307 A1 | 3/2013 | Livne |
| 2013/0081101 A1 | 3/2013 | Baer et al. |
| 2013/0086466 A1 | 4/2013 | Levy et al. |
| 2013/0091550 A1 | 4/2013 | Joyce et al. |
| 2013/0132854 A1 | 5/2013 | Raleigh et al. |
| 2013/0152169 A1 | 6/2013 | Stuntebeck |
| 2013/0165232 A1 | 6/2013 | Nelson et al. |
| 2013/0174223 A1 | 7/2013 | Dykeman et al. |
| 2013/0226696 A1 | 8/2013 | Cook |
| 2013/0229930 A1 | 9/2013 | Akay et al. |
| 2013/0244614 A1 | 9/2013 | Santamaria et al. |
| 2013/0254401 A1 | 9/2013 | Marshall et al. |
| 2013/0275038 A1 | 10/2013 | Hania et al. |
| 2013/0283370 A1 | 10/2013 | Vipat et al. |
| 2013/0285855 A1 | 10/2013 | Dupray et al. |
| 2013/0304898 A1 | 11/2013 | Aggarwal et al. |
| 2013/0347053 A1 | 12/2013 | Motoyama |
| 2014/0006347 A1 | 1/2014 | Qureshi et al. |
| 2014/0007182 A1 | 1/2014 | Qureshi et al. |
| 2014/0013420 A1 | 1/2014 | Piccionelli et al. |
| 2014/0025256 A1 | 1/2014 | Armitage et al. |
| 2014/0053229 A1 | 2/2014 | Saib |
| 2014/0053250 A1 | 2/2014 | Wethington et al. |
| 2014/0066098 A1 | 3/2014 | Stern et al. |
| 2014/0068717 A1 | 3/2014 | Mayes et al. |
| 2014/0073244 A1 | 3/2014 | Ko et al. |
| 2014/0082501 A1 | 3/2014 | Bae et al. |
| 2014/0084067 A1 | 3/2014 | Vanderhulst |
| 2014/0096180 A1 | 4/2014 | Negi et al. |
| 2014/0096212 A1 | 4/2014 | Smith et al. |
| 2014/0113556 A1 | 4/2014 | Kotecha |
| 2014/0123224 A1 | 5/2014 | Nosrati |
| 2014/0143852 A1 | 5/2014 | Cottrell et al. |
| 2014/0162688 A1 | 6/2014 | Edge |
| 2014/0171060 A1 | 6/2014 | Cook et al. |
| 2014/0177495 A1 | 6/2014 | Mallikarjunan et al. |
| 2014/0198024 A1 | 7/2014 | Adzhigirey et al. |
| 2014/0213179 A1 | 7/2014 | Rosenberg |
| 2014/0214668 A1 | 7/2014 | Lotter et al. |
| 2014/0215212 A1 | 7/2014 | Dempster et al. |
| 2014/0222504 A1 | 8/2014 | MacKenzie et al. |
| 2014/0223177 A1 | 8/2014 | Dempster et al. |
| 2014/0230038 A1 | 8/2014 | Leong et al. |
| 2014/0237235 A1 | 8/2014 | Kuno et al. |
| 2014/0237614 A1 | 8/2014 | Irvine |
| 2014/0258481 A1 | 9/2014 | Lundell |
| 2014/0282877 A1 | 9/2014 | Mahaffey et al. |
| 2014/0287688 A1 | 9/2014 | Dempster et al. |
| 2014/0310771 A1 | 10/2014 | Marshall et al. |
| 2015/0156205 A1 | 6/2015 | Yin et al. |
| 2015/0163336 A1 | 6/2015 | Ramos et al. |
| 2015/0207795 A1 | 7/2015 | Wentz et al. |
| 2017/0269955 A1 | 9/2017 | Hardy |

FOREIGN PATENT DOCUMENTS

| | | |
|---|---|---|
| GB | 2309860 | 5/2000 |
| GB | 2346716 | 8/2000 |
| GB | 2361558 | 10/2001 |
| JP | H07141245 | 6/1995 |
| JP | H08251660 | 9/1996 |
| JP | 2007304009 | 11/2007 |
| JP | 2011234084 | 11/2011 |
| WO | 9600485 | 1/1996 |
| WO | 9704389 | 2/1997 |
| WO | 9922322 | 5/1999 |
| WO | 0003316 | 1/2000 |
| WO | 0241661 | 5/2002 |
| WO | 2010052669 | 5/2010 |
| WO | 2011022053 | 2/2011 |
| WO | 2012098596 | 7/2012 |
| WO | 2013011512 | 1/2013 |
| WO | 2013109040 | 7/2013 |

OTHER PUBLICATIONS

Office Action dated Mar. 27, 2018 for U.S. Appl. No. 15/620,922.
Anonymous: "can you download free apps without apple id / Officeial Apple Support Communities (1st question and answer)", May 5, 2012 (May 5, 2012), XP055335582, Retrieved from the Internet: URL https://discussions.apple.com/thread/3928236?start=0&tstart=0 [retrieved on Jan. 16, 2017].
Asynchrony Software, Inc., "PDA Defense User Guide", 726, 2002.
Belani, Eshwar et al., "The CRISIS Wide Area Security Architecture", 726, 1998.
Benaloh, Josh et al., "Patient Controlled Encryption: Ensuring Privicy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726 Feb. 5, 1996.
Steiner, Jennifer, "Kerberos: An Authentication Service for Open Network Systems", 726, Jan. 12, 1988.
Strunk, John et al., "Self-Securting Storage: Protecting Data in Compromised Systems", Symposium on Operating Systems Design and Implementation, 726, 2000.
Margaret Rouse, Client/Server (client/server model, client/server architecture), Rouser, Oct. 30, 2008, Searchnetwork, pp. 1-2 (Year: 2008).
Mobile Application Management, Meeting the BYOD challenge with next-generation application and device management, Kony, Jul. 2012, pp. 1-16 (Year: 2012).
How to Keep Your Personal Information Secured, Federal Commission, Jul. 2012, pp. 1-4 (Year: 2012).
The Dark Side of BYOD—Privacy, Personal Data Loss and Device Seizure, Trend Micro, Jan. 31, 2012, pp. 1-3 (Year: 2012).
Gong, Li; et al. "Multicast Security and Its Extension to Mobile Environment", Oct. 1995.
Infinite Technologies, "Infinite Interchange", 1997.

(56) References Cited

OTHER PUBLICATIONS

Kiiskinen, Jani; et al. "Data Channel Service for Wireless Telephone Links" Jan. 1996.
Latedroid, "JuiceDefender" Jan. 15, 2012.
Nokia, "Nokia 9000i Owner's Manual" 1997.
Ratner, David; et al. "Replication Requirements in Mobile Environments" Nov. 2001.
Ratner, David H. "Roam: A scalable Replication System for Mobile and Distributed Computing", Jan. 1998.
Research in Motion, "Blackberry Wireless Handheld 5810 Getting Started Guide" Jan. 15, 2003.
Research in Motion, "Blackberry Wireless Handheld 5810 Quick Reference Guide" 2003.
Research in Motion, "Blackberry Wireless Handheld 5810 User Guide" 2003.
Stajano, Frank; et al. "The Thinnest of Clients: Controlling It All Via Cellphone" Mobile Computing and Communications Review, vol. 2, No. 4, Oct. 1998.
Sybase, "MobiLink Synchronization User's Guide", Part No. 38132-01-0800-01, Nov. 2001.
Symantec Corporation, "Creating Norton pcAnywhere Scripts" 1994.
Traveling Software, Inc., "LapLink for Windows 95" 1996.
Wachowicz, Moniza; et al. "Combining Location and Data Management in an Environment for Total Mobility" In Proceedings for the International Workshop on Information Visualization an Mobile Computing, 1996.
Xcellenet, Inc., "RemoteWare Client for Windows NT and Windows 95 User's Guides" 1996.
Xcellenet, Inc., "RemoteWare Forms and RemoteWare Query" 1994.
Xcellenet, Inc., "RemoteWare Forms Getting Started Guide" 1994.
Xcellenet, Inc., "RemoteWare Server for Windows NT" 1996.
Xcellenet, Inc., "RemoteWare Server Operations Guide" 1992.
Office Action mailed for U.S. Appl. No. 15/620,922.

* cited by examiner

137f

Add Document

Location Group* [Internal] —603

File* [          ] [Upload] —609
         606

Max Allowed File Size: 200MB

Edit Document - 20000 Leagues ⊗

| Info | Details | Previous Versions | Security | Assignment | Deployment | —703

Name* [20000 Leagues]
File* [20000 Leagues epub]
Version [1.0]
Description [                    ] ←—706

Importance [Normal ▽]
Category* [ePUB                ×]
[Select a Category]

709—[ Save ]  [ Reset ]—713

FIG. 7

CONTROLLNG DISTRIBUTION OF RESOURCES IN A NETWORK

CROSS REFERENCE TO RELATED APPLICATIONS

This application claims priority to copending U.S. patent application Ser. No. 13/396,356 filed on Feb. 14, 2012, and entitled "Controlling Distribution of Resources in a Network," which is incorporated by reference as if set forth herein in its entirety.

BACKGROUND

Controlling access to and distribution of enterprise resources, such as documents, databases, and executable applications, in a networked environment is critical to ensure that only authorized users and network-connected devices may gain access to sensitive information. Depending on the sensitivity of a given resource, an array of authorization rules may be necessary to ensure that the resource is adequately protected. Some resources may only require ensuring that the proper user is requesting the resource. Other resources may require compliance with more stringent authorization rules, such as determining whether an appropriate transport protocol used (i.e., http and/or https) by the requesting device, determining whether access to the resource is permitted for a specified duration or at a given time, determining whether the resource is accessed from a secured device, etc.

To date, enterprises have distributed resources to network-connected resource using internal secured networks and VPN tunnels to those networks. While these methods provides secure channel for distribution, these methods typically do not authenticate the recipient beyond ensuring a proper recipient. Furthermore, these methods are ineffective in continuously ensuring that the resource is protected. In particular, these methods fail to ensure that the resource is protected beyond the initial grant access to the resource. This is additionally problematic, as the recipient of the resource may at some point cease to comply with the conditions required to receive the resource. Finally, these methods do not restrict authorized recipient from subsequently transmitting certain resources to other potentially unauthorized recipients.

SUMMARY OF THE INVENTION

Disclosed are embodiments for a computing device configured to execute a distribution service for controlling distribution of resources in a networked environment. The distribution service comprises logic that receives a request to access the distribution service, wherein the request identifies a pairing of the user of a client device and the client device; and logic that determines whether the user and the client device pairing is authorized to access the distribution service based on whether the pairing satisfies one or more authorization rules. Additionally, responsive to the determination that the user and client device pairing is authorized to access the distribution service, the distribution service further comprises logic that identifies which of plurality of resource grouping identifiers are associated with the user and client device pairing; logic that identifies which of a plurality of resources are associated with the resource grouping identifiers; logic that determines whether the client device complies with a plurality of distribution rules associated with each one of the identified resources; and logic that serves up the identified resources to the client device based on whether the client device complies with the distribution rules associated with each of the identified resources.

Disclosed are embodiments for transmitting, from a client device a request to access a quantity of resources, wherein the request identifies a pairing of a user of the client device and the client device; receiving the resources and a plurality of distribution rules associated with each one of the resources; and determining whether the client device complies with the distribution rules. Additionally, responsive to the determination that the client device is compliant, rendering the resources on a display associated with the client device.

Disclosed are embodiments for a non-transitory computer-readable medium embodying a program executable in a computing device, the program comprising code that receives request to access a plurality of resources served up by a distribution service, the request comprising at least one of plurality of user credentials, a plurality of client device identifiers, and a client device profile. Additionally, the program comprises code that determines whether the user and the device pairing is authorized to access the resources based at least in part on a plurality of authorization rules; code that determines which of the accessible resources are qualified to be served up to the user of the client device based at least in part on a plurality of distribution rules associated with the accessible resources; and code that serves up the accessible resources qualified to be served up.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

FIGS. 2-7 are exemplary user interfaces rendered on a client device in the networked environment of FIG. 1 according to certain embodiments of the present disclosure.

DETAILED DESCRIPTION

Disclosed are various embodiments for a system and associated devices and methods for controlling distribution of resources in a network. The exemplary system comprises a distribution server and a plurality of client devices configured as described herein.

In one embodiment, a distribution service executed by a distribution server serves up resources to a client device if the client device and a user of the client device are authorized to receive the resources. The distribution service first determines whether the user and client device pairing are authorized to communicate with the distribution service based at least in part on a plurality of authorization rules. For example, are authorization approach as described in application Ser. No. 13/316,073 entitled "CONTROLLING ACCESS TO RESOURCES ON A NETWORK," which is incorporated herein by reference, may be employed to determine whether the client device and the user of the client device are authorized.

Upon determining that the user and the client device pairing are authorized, the distribution service determines a plurality of resource grouping identifiers associated with the user and client device pairing. For instance, each resource may be associated with one or more resource grouping identifiers. Resource grouping identifiers are used to identify a grouping (i.e., one or more) of resources that may be provided to authorized user and client device pairings. The distribution service then identifies a plurality of resources that are associated with each one of the resource grouping identifiers and serves up the identified resources to the user of the client device if the client device complies with the distribution rules associated with each one of the identified resources. For instance, the distribution may determine that the client device complies with the distribution rules based at least in part on data selected from a device profile of the client device.

In one embodiment, the resources referenced herein may include any electronic data, such as databases, applications, text files, word processor files, spreadsheet files, presentation files, graphic files, audio files, photographic files, video files, applications and application files, and/or the like. More specifically, resources may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

Figure 1:
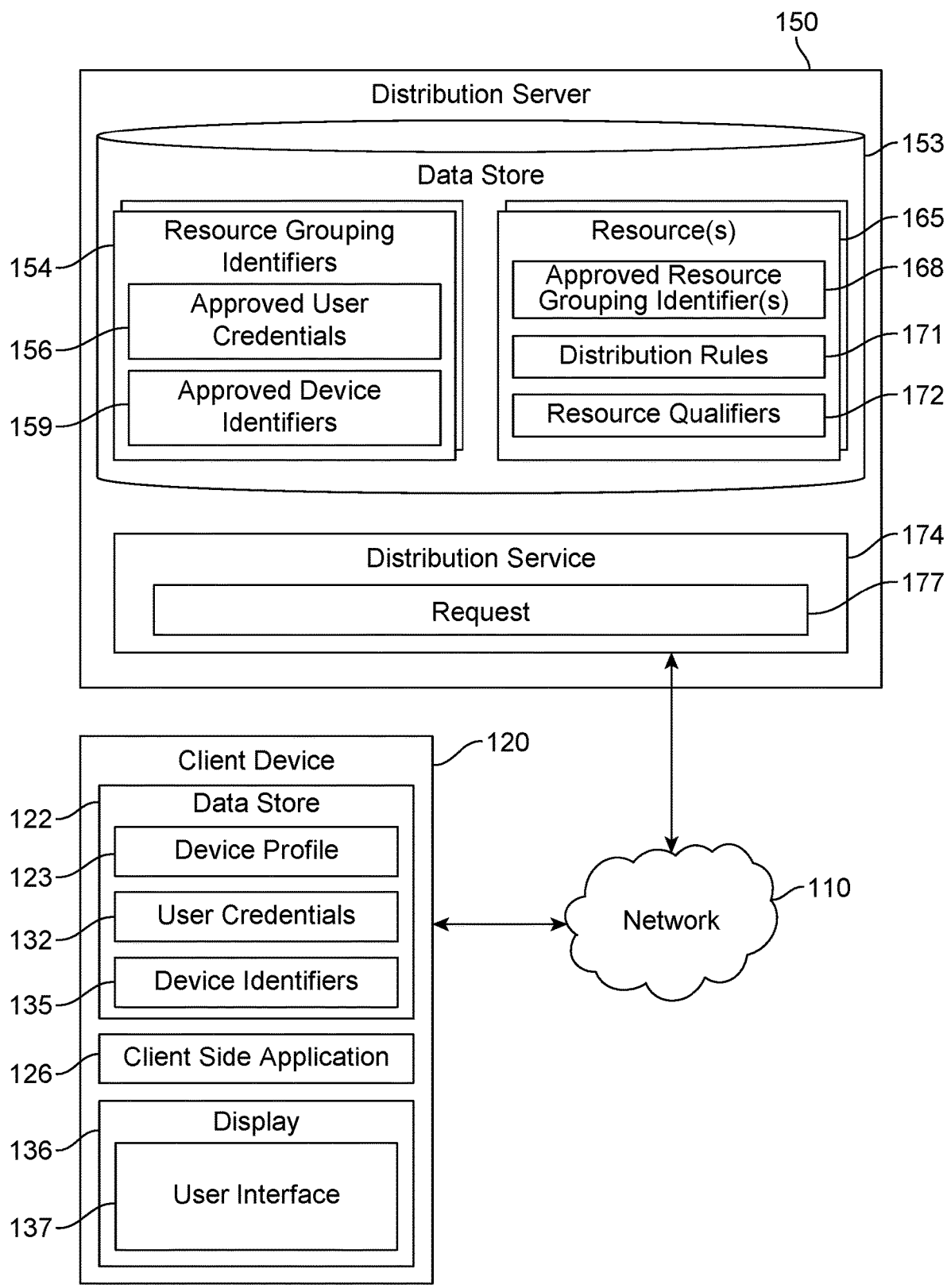
FIG. 1 is a block diagram of a networked environment according to certain exemplary embodiments of the present disclosure.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (WWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In one embodiment, the network 110 facilitates transmission of resources 165 between one or more client devices 120 and a distribution server 150.

The client device 120 may be a desktop computer, a laptop computer, a personal digital assistant, a cellular telephone, a set-top box, a music player, a web pad, a tablet computer system, a game console, and/or another device with like capability. The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 is operable to communicate via wired connection with the distribution server 150 with the aid of the wired network connectivity component. The client device 120 is further operable to communicate wirelessly with the distribution server 150 with the aid of the wireless network connectivity component. Additionally, the client device 120 may further comprise a memory for storing data and applications, a processor for executing applications stored in memory, and a local interface such as a bus, as will be described with respect to FIG. 10.

Additionally, the client device 120 may store in a data store 122 a device profile 123, user credentials 132, a device identifier 135, and other data. In one embodiment, the device profile 123 may represent hardware, software, and security attributes that describe the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. Additionally, the device profile 123 may include data indicating a date of a last virus scan of the client device 120, a date of a last access by an IT representative, a date of a last access by the distribution server 150, a date of a last service by the IT representative, and/or any other data indicating a date of last maintenance.

The user credential 132 may uniquely identify the user of the client device 120. For example, the user credentials 132 may include a username, a password, and/or biometric data related to facial recognition, retina recognition, fingerprint recognition, and the like. The device identifier 135 may uniquely identify the client device 120. For example, the device identifier 135 may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the device identifier 135 may be represented by a unique software identifier such a token or certificate, based at least in part n the aforementioned unique hardware identifiers.

The client device 120 may further be configured to execute various applications. For example, the client device 120 may be configured to execute applications such as web browsing applications, email applications, instant messaging applications, and/or other applications capable of receiving and/or rendering resources 165 on a display 136 associated with the client device 120. Any applications capable of receiving and/or rendering resources on a display 136 is generally referred to herein as a "client side application" 126. The client side application 126 may be stored in the memory of the client device 120.

The client side application 126 may be executed to transmit requests to access resources 165 to the distribution server 150 and render a user interface 137 on the display 136 that provides access to the resources 165. In particular, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120. Furthermore, a client side application 126 may be executed to present a single resource 165 or a series of resources 165 in a comprehensive manner, for instance, presenting photograph files in a slideshow presentation. Additionally, the client side application 126 may be executed to render an environment that presents an array of resources 165 in a single view, such as a category-based tree or outline format, based at least in part on a resource qualifier 172 associated with the resources 165. In one embodiment, the client side application 126 may be a secure container program that may be authorized to receive and render selected resources 165, as described herein. In another embodiment, the client side application 126 may be a browser configured to be executed as described herein.

In one embodiment, the resource qualifier 172 may be or include metadata that describes and/or regulates the use of the respective resource 165. For example, a resource qualifier may include categories/sub-categories to which the resource 165 belongs, an indication that the resource 165 is considered a favorite, an indication of whether the resource 165 is privately owned, publicly owned, and/or enterprise-owned, an indication of whether the resource 165 is confidential, an indication of whether the resource 165 is password protected, an indication of the historical version of the resource 165, a description of the resource 165, one or more comments regarding the resource 165, an indication of the size and format of the resource 165, an indication of the download priority associated with the resource 165, an indication of the expiration date associated with the resource 165, an indication of the effective date associated with the resource 165, an indication of the ownership of the resource 165, an indication of the managing party of the resource 165, and/or the like, or any combination of resource qualifiers.

The client side application 126 may also facilitate the modification of resources 165 provided by the distribution service 174 and the modification of data associated with the provided resources 165. For example, the client side application 126 may include functionality for adding content to the existing resources 165, removing content from the existing resources 165, altering the content of existing resources 165, adding resource qualifiers 172 associated with the existing resources 165, and/or the like, or any combination of manipulations of the resources 165.

The client side application 126 may further be executed to add new resources 165 to be hosted by the distribution server 150. For example, a user having administrator-level user credentials 132 may manipulate the use interface 137 to transfer copies of resources 165 locally stored on the client device 120 to the distribution server 150 to be included in the data store 153. In one embodiment, the user of the client device 120 may initiate upload of one more resources 165 via the user interface 137 rendered by the client side application 126, as can be appreciated. In addition, the user may indicate approved resource grouping identifiers 168 that are permitted to access the uploaded resource 165 and specify distribution rules 171 that are required to be complied with in order to access the uploaded resource 165, as will be described. In another embodiment, a user without administrator-level user credentials 132 may manipulate the user interface 137 to transfer local copies of personal resources 165 to the distribution server 150. In this example, the resources qualifiers 172 associated with the personal resources 165 may be configured by default to restrict access by any other user.

Additionally, the client side application 126 may also be configured to optionally restrict access to the resources 165 by other applications executed by the client device 120, thereby preventing access to the resources 165 from an application other than the client side application 126. In one embodiment, the client side application 126 may monitor network traffic between the client device 120 and the distribution server 150 and identify any data being transmitted between an application executed by the client device 120 other than the client side application 126 and the distribution server 150. The client side application 126 may then determine whether a resource 165 is being provided to an application other than the client side application 126 executed by the client device 120 and intercept and/or block the incoming resource 165. In one embodiment, the client side application 126 may then allow the intercepted resource 165 to be accessible to the user via a user interface 137 rendered by the client side application 126. In other embodiments, the client side application 126 may deny access to the intercepted resource 165 by any other application on the client device 120. Additionally, the client side application 126 may be executed to call on other services associated with the resources 165 that are executed on the distribution server 150 or another server or device accessible to the client side application 126, for instance, a technical support service that may be executed on the distribution server 150.

The distribution server 150 may comprise, for example, a server computer or any other system providing distribution capability. Alternatively, a plurality of distribution servers 150 may be employed that are arranged, for example, in one or more server banks or computer banks or other arrangements. For example, a plurality of distribution servers 150 together may comprise a cloud computing resource, a grid computing resource, and/or any other distributed computing arrangement. Such distribution servers 150 may be located in a single installation or may be distributed among many different geographic locations. For purposes of convenience, the distribution server 150 is referred to herein in the singular. Even though the distribution server 150 is referred to in the singular, it is understood that a plurality of distribution servers 150 may be employed in the arrangements as described herein.

Certain applications and/or other functionality may be executed in the distribution server 150 according to certain embodiments. Also, certain data is stored in a data store 153 that is accessible to the distribution server 150. The data store 153 may be representative of a plurality of data stores, as can be appreciated. The data stored in the data store 153, for example, is associated with the operation of the applications and/or functional entities described herein. The data store 153 may utilize strong encryption standards to protect the resources 165 from unauthorized access. For example, the data store 153 may utilize SHA-1 (Standard Hash Algorithm) or a similar strong encryption standard commonly utilized for server-side data storage.

The components executed on the distribution server 150, for example, include the distribution service 174 and other applications, services, processes, systems, engines, or functionality not disclosed in detail herein. The distribution service 174 is executed to provide resources 165 stored in the data store 153 to a requesting client device 120 based on resource grouping identifiers 154 and distribution rules 171, as will be described. In addition, the distribution service 174 may also accept new resources 165 provided by the user of the client device 120, and previously provided resources 165 modified by the user of the client device 120, as will be described.

The data store 153 may include resource grouping identifiers 154, resources 165, and/or other data. The resource grouping identifiers 154 may represent unique identifiers for previously determined resource groupings and are used to determine which resources 165 are served up to the user of the client device 106, as will be described. For example, a resource grouping may relate to organizational groups, organizational roles, geographic locations, and/or any other type of grouping that require access to a type of resource. Each resource grouping identifier 154 may be associated with a pairing of at least one of a plurality of approved user credentials 156 and at least one of a plurality of approved device identifiers 159. In one embodiment, each combination of approved user credentials 156 and approved device identifiers 159 may be associated with more than one of the resource grouping identifiers 154. Additionally, the pairing of approved user credentials 156 and approved device identifiers 159 may be associated with a user's organizational role and/or capacity. For instance, the pairing of approved user credentials 156 and the approved device identifiers 159 may be predetermined by an IT administrator. In another embodiment, the pairing of approved user credentials 156 and the approved device identifiers 159 may be automatically associated with the resource grouping identifiers 154 based at least upon a user's pay grade, organizational level, status within the organization, and/or any other organizational factor.

Each resource 165 may be associated with a listing of approved resource grouping identifiers 168 and a plurality of distribution rules 171. In one embodiment, the listing of approved resource grouping identifiers 168 includes a plurality of resource grouping identifiers 154 that regulate access to the respective resource 165. In one embodiment, the listing of approved resource grouping identifiers 168 may be predetermined by an IT administrator. For instance, the IT administrator may specify which resource grouping identifiers 154 are permitted access to the respective resource 165. Additionally, the distribution rules 171 regulate how a user having the appropriate user credentials 132 and device identifier 135 combination may access the respective resource 165. For example, in some embodiments, the distribution rules 171 may describe a required and/or a permitted state that an accessing client device 120 must satisfy in order for the client device 120 to be permitted access to the resource 165. The distribution rules 171 may include but are not limited to hardware requirements, software requirements, configuration requirements, maintenance requirements of a client device, and/or requirements related to the resource 165.

Additionally, in one embodiment, hardware requirements may include requirements associated with the CPU, memory, power supply, external storage, peripherals, and/or the like. Software requirements may include requirements associated with the operating system type and version, operating system authenticity and jailbreak/rooted status, installed application types and versions, and/or the like. Configuration requirements may include requirements associated with the configuration of the hardware, software, data encryption methods, transport protocols, and/or the like. Maintenance requirements may include requirements associated with the date of last virus scan for the client device 120, the date of the last access of the client device 120 by IT, the date of last communication between the client device 120 and the distribution server 150, the date of last tune-up of the client device 120, and/or the like. Requirements related to the resource 165 may include whether the resources 165 may be rendered while the client device 120 is offline and/or not in communication with the distribution service 174, whether to permit synchronization of the resources 165 with a remote data store, whether to restrict the resources 165 from being forwarded, whether to permit storing resources 165 locally on the client device 120, and/or the like. Alternatively, the resources 165 and distribution rules 171 may be stored on another data store accessible to the client device 120 and/or other storage facility in data communication with the distribution server 150, such as an internal mail server, a web-based email server, an internal file server, a third-party hosted file server, a cloud-based server, or a cached local data store on the client device 120.

A user operating a client device 120 may wish to access resources 165 stored on the distribution server 150. In one embodiment, the user may manipulate a user interface 137 rendered by the client side application 126 to transmit a request 177 for accessing one or more, resources 165 on the distribution server 150. For instance, the user may provide user credentials 132, such as, a unique user name, a password, biometric data, and/or other types of user credentials 132 to request access to the distribution server 150. The client side application 126 may transmit the request 177 to the distribution service 174. In one embodiment, the request 177 may include the user credentials 135 provided by the user, the device identifier 135 that uniquely identifies the client device 120, and/or any other relevant information.

The distribution service 174 receives the request 177 and determines whether the user is authorized to access the resources 165 from the client device 120. For instance, the distribution service 174 may use an authorization approach as described in U.S. application Ser. No. 13/316,073 entitled "CONTROLLING ACCESS TO RESOURCES ON A NETWORK," which is incorporated herein by reference. As another example, the distribution service 174 may determine that the user is authorized to access the resources 165 from the client device 120 based on the user credentials 132 and the device identifier 135 provided with the request 177.

Upon determining that the user is authorized to access the resources 165 from the client device 120, the distribution server 150 determines which of the resources 165 to provide to the client device 120. In one embodiment, the distribution service 174 determines which resources 165 to provide based n the resource grouping identifiers 154 associated with each resource 165. For instance, the distribution service 174 may first determine which resource grouping identifier 154 are associated with the pairing of user credentials 132 and the device identifier 135 included in the request 177. In one embodiment, the distribution service 174 parses the listing of approved user credential 156 and the listing of approved device identifiers 159 of each resource grouping identifier 154 of each resource grouping identifier 154 to determine whether the respective resource grouping identifier 154 is associated with both the user credentials 132 and the device identifier 135.

Next, the distribution service 174 identifies a resource 165 to provide to the user of the client device 120 based on the determined resource grouping identifiers 154. In one embodiment the distribution service 174 identifies one or more resources 165 associated with each one of the determined resource grouping identifiers 154. In another embodiment, the distribution service 174 identifies the resource 165 if the resource 165 is associated with all of the determined resource grouping identifiers 154. Additionally, in another embodiment, the distribution service 174 identifies the resource 165 if it is associated with a threshold number of the resource grouping identifiers 154. The distribution service 174 may then provide the identified resources 165 to the user of the client device 120.

In another embodiment, before the identified resources 165 are provided to the user, the distribution service 174 may additionally determine whether the client device 120 from which the user requested access to the resources 165 complies with the distribution rules 171 associated with each one of the identified resources 165. For example, the distribution service 174 may determine whether the device profile 123 describing the state of the client device 120 complies with the distribution rules 171 of each identified resource 165. As discussed above, the device profile 123 may include hardware specifications of the client device 120, software specifications of the client device 120, version information of various other components of the client device 120, and/or any other information profiling the client device 120. In one embodiment, the distribution service 174 may provide each identified resource 165 to the user if the client device 120 complies with all of, or at least a portion of, the distribution rules 171 associated with each of the identified resources 165. Additionally, in another embodiment, the distribution service 174 may provide the identified resource(s) 165 to the user if the client device 120 complies with at least a threshold number of the distribution rules 171 associated with each of the identified resources 165.

Responsive to a determination that the client device 120 is in a state of compliance with the distribution rules 171, the distribution service 174 may be further executed to transmit the identified resources 165 to the client device 120. In one embodiment, the distribution service 174 may automatically transmit the identified resources 165 to the client device 120. In another embodiment, the distribution service 174 may make the identified resources 165 available for download by the client device 120 based on a resource qualifier associated with the respective resource 165. For instance, the resource qualifier may indicate the respective resource 165 be made available for download to the client device 120. In this example, the user may transmit a request to the distribution service 174 to download the respective resource 165.

In one embodiment, the state of the client device 120 may have been modified between the time the distribution service 174 makes the identified resource 165 available for download and the time the distribution service 174 receives the request to download the identified resource 174. For example, the client device 120 may have switched connectivity from a secured network 110 to an unsecured network 110. In this embodiment, the distribution service 174 may determine for a second time whether the client device 120 complies with the distribution rules 171. For example, the request to download transmitted from the client device 120 may include an updated device profile 123. The distribution service 174 may make the second determination of whether the client device 120 complies with the distribution rules 171 based on the updated device profile 123. For instance, the distribution rules 171 may require that the client device 106 be connected to a secured network 110 to gain access to the resource and the second determination of compliance may reveal that the client device 120 is connected to an unsecured network 110. Responsive to the second determination that the client device 120 complies with the distribution rules 171, the distribution service 174 provides the requested resource 165. In another embodiment, the device profile 123 may be periodically transmitted by the client side application 126 to the distribution server 150. In this embodiment, each time the device profile is transmitted to the distribution server 150, the distribution service 174 may determine whether the updated client device 120 complies with the distribution rules 171 using the updated device profile 123.

In another embodiment, the distribution service 174 may transmit the distribution rules 171 associated with each one of the identified resources 165 to the client device 120. For example, the distribution service 174 may transmit the distribution rules 171 to the client side application 126 for determining whether the client device 120 complies with the distribution rules 171. In one embodiment, the distribution service 174 may not determine whether the client device 120 complies with the distribution rules 171 of each of the identified resources 165 and instead permit the client side application 126 to make this determination. For instance, the client side application 126 may determine whether the client device 120 complies with the distribution rules 171 associated with the received resource 165 prior to rendering the received resource 165 on the display 136.

In another embodiment, the distribution service 174 may first transmit the distribution rules 171 to the client device 120 prior to transmitting the identified resources 165. The client side application 126 may then determine whether the client device 120 complies with the distribution rules 171, as described above. The client side application 126 may then transmit an indication back to the distribution service 174 of the compliance status. Responsive to receiving an indication from the client device 120 that the client device 120 complies with all and/or a sufficient portion of the distribution rules 171 associated with each respective resource 165, the distribution service 174 may then transmit the appropriate identified resources 165 to the client device 120. Additionally, the client side application 126 may store the distribution rules 171 in a memory associated with the client device 120, such as the data store 122. Upon subsequent requests to access the identified resource 165, the distribution service 174 may wait to receive an indication from the client side application 126 that the client device 120 complies with the distribution rules 171 associated with the requested resource 165 before transmitting the requested resource 165. For example, the client side application 126 may use the stored distribution rules 171 received from a previous request to make the determination and transmit the request.

The distribution service 174 may be further executed to log all activity related to the resources 165 for asset tracking purposes. For example, the distribution service 174 may log activities such as transmission of resources, historical data related to the transmission of the resource, data related to the rendering of the resources 165 by the client device 120, data related to a storage location of the resources 165, data related to communication with the client device 120, data related to resource qualifiers associated with the resources 165, data related to client device 120 compliance with distribution rules 171, data related to usage and availability of bandwidth, and/or any other data related to the resources 165.

In an additional embodiment, the distribution service 174 may periodically determine whether the transmitted resources 165 have been modified on the client device 120 and synchronize the modified resource 165 on the client device 120 with the unmodified resource 165 on the distribution server 150. For instance, the distribution service 174 may determine whether the resource 165 has been modified based on edit date, modified date, and/or an access date associated with the resource 165. In this embodiment, the distribution service 174 may periodically request to receive the relevant date from the client side application 126. Upon receiving the relevant date, the distribution service 174 compares the relevant date from the client device 120 with the corresponding date on the distribution server 150 and determines to synchronize the respective resources 165 if the two relevant dates do not match. For instance, the distribution service 174 may employ a synchronization approach as is known in the art. In one embodiment, the distribution service 174 may employ the synchronization approach after determining whether the user is permitted to modify the resource 165 on the client device 120. In another embodiment, the distribution service 174 may remove the resource 165 on the client device 120 upon synchronizing with the distribution server 150. In another embodiment, the distribution service 174 stores the modified resource 165 in the data store 153 as one of a plurality of versions of the respective resource 165.

In another embodiment, the client side application 126 may be pre-authorized to access at least some of the resources 165 hosted by the distribution server. In such embodiments, the distribution service 174 may be configured to provide to the client side application 126 a listing of all resources 165 available for download by the client device 120 based only on certain embedded authorization data (e.g., device identifier 135, and/or device profile 123, etc.) and without requiring the client side application 126 to provide additional authorization data (e.g., user name and password). For example, the distribution service 174 may identify resources 165 to include in the listing by determining which of the resources 165 are associated with distribution rules 171 that correspond with the device profile 123 of the client device 120. The distribution service 174 may then allow the client side application 126 to download at least some of the available resources 165. However, one or more of the available resources 165 may be associated with a distribution rule 171 that requires additional authorization. For instance, the resource 165 may be a document containing sensitive information that requires authorization of a username and password or other additional authorization data. Thus, if the client side application 126 submits a request to download such a resource 165, the distribution server 174 may prompt the client side application to provide additional authorization data. In response, the client side application 126 may prompt the user to provide user credentials 132. In one embodiment, the client side application 126 may transmit the user credentials 132 and/or the device identifier 135 of the client device 120 to the distribution service 174. The distribution service 174 may then authorize the user to access the sensitive resource 165 using an authorization approach as described in U.S. application Ser. No. 13/316,073 entitled "CONTROLLING ACCESS TO RESOURCES ON A NETWORK," which is incorporated herein by reference. Upon determining that the user is authorized to access the sensitive resource 165 from the client device 120, the distribution service 174 may allow the client side application 126 to download the sensitive resource 165.

Figure 2:
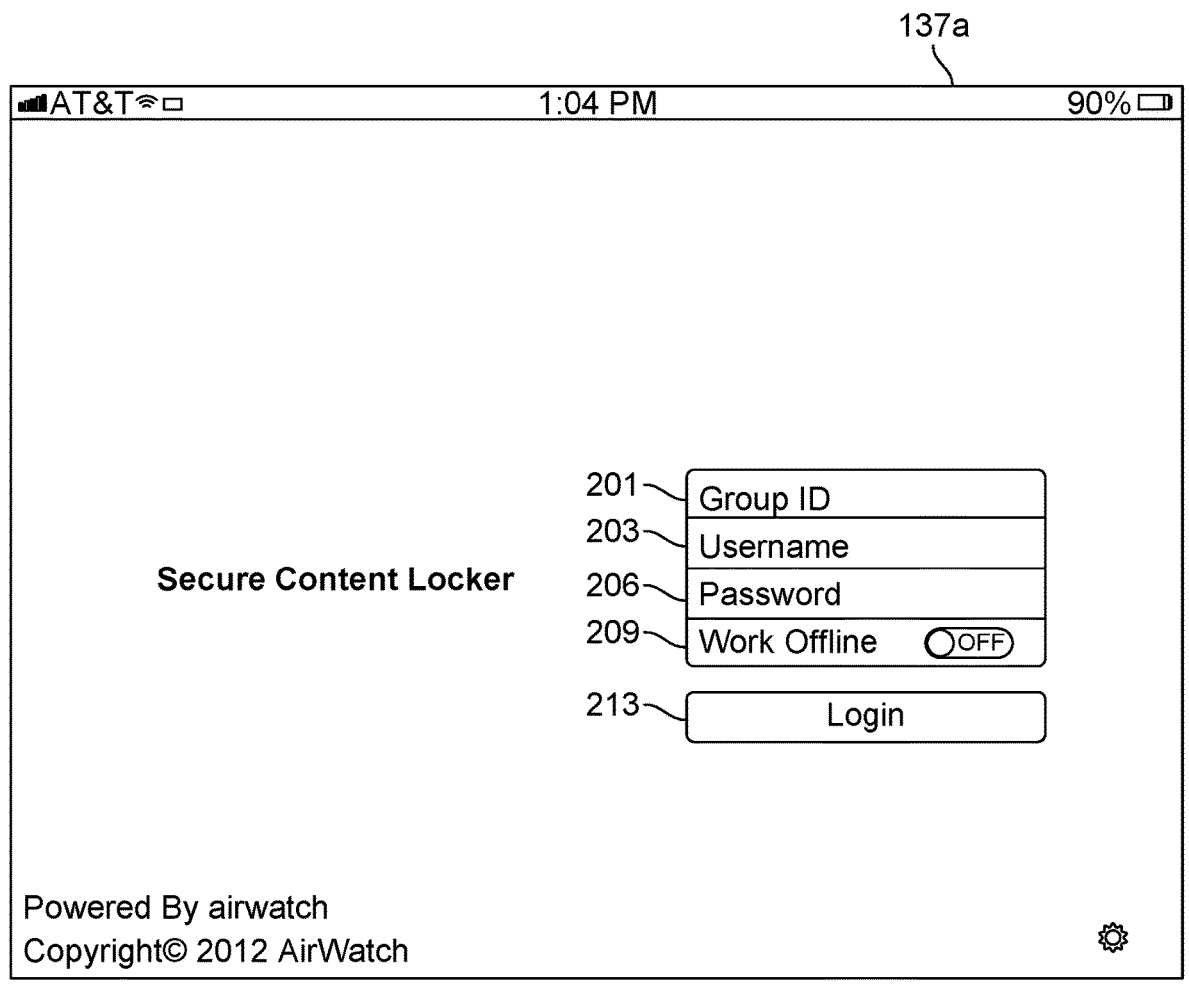
Figure 3:
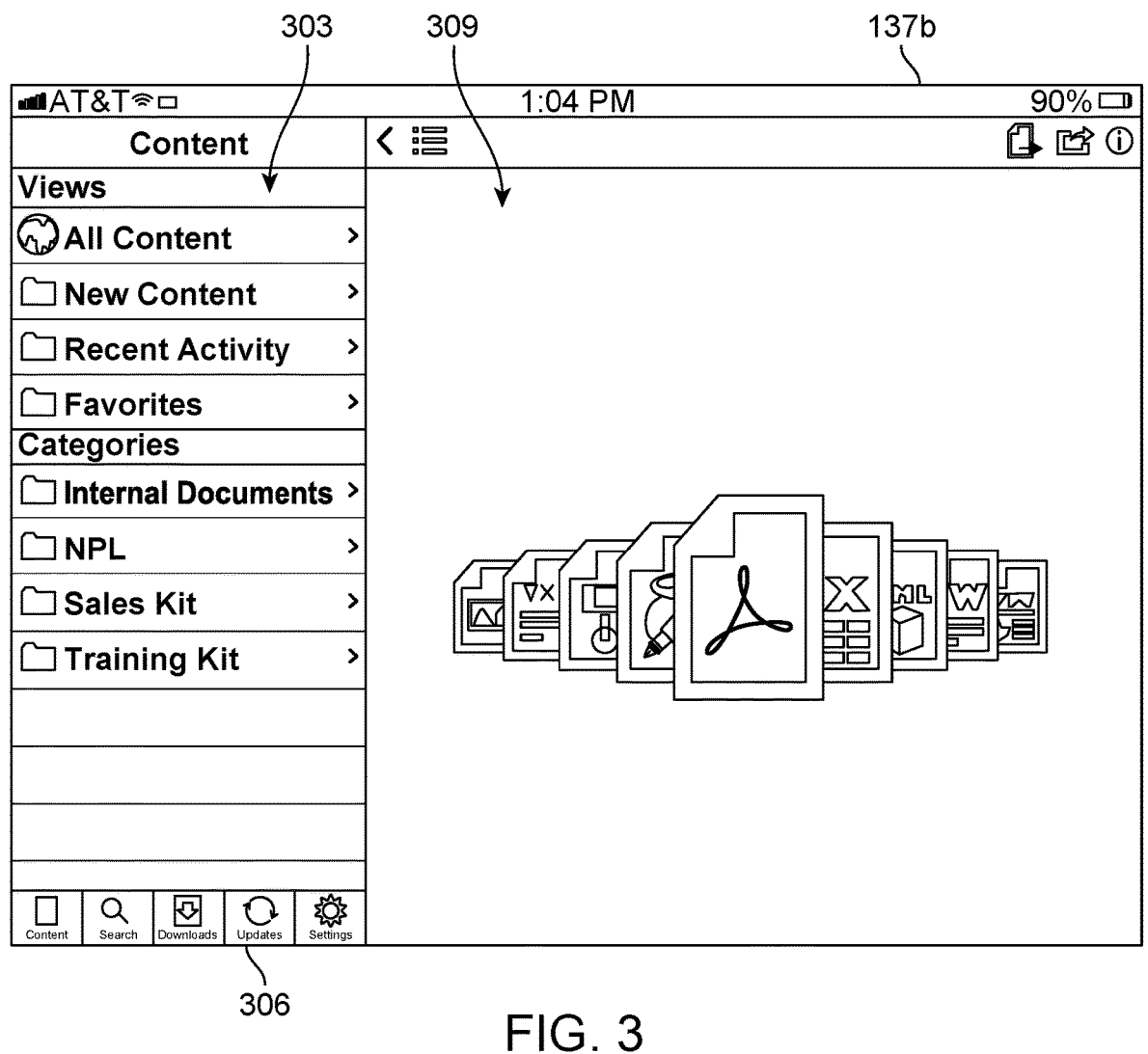
Figure 4:
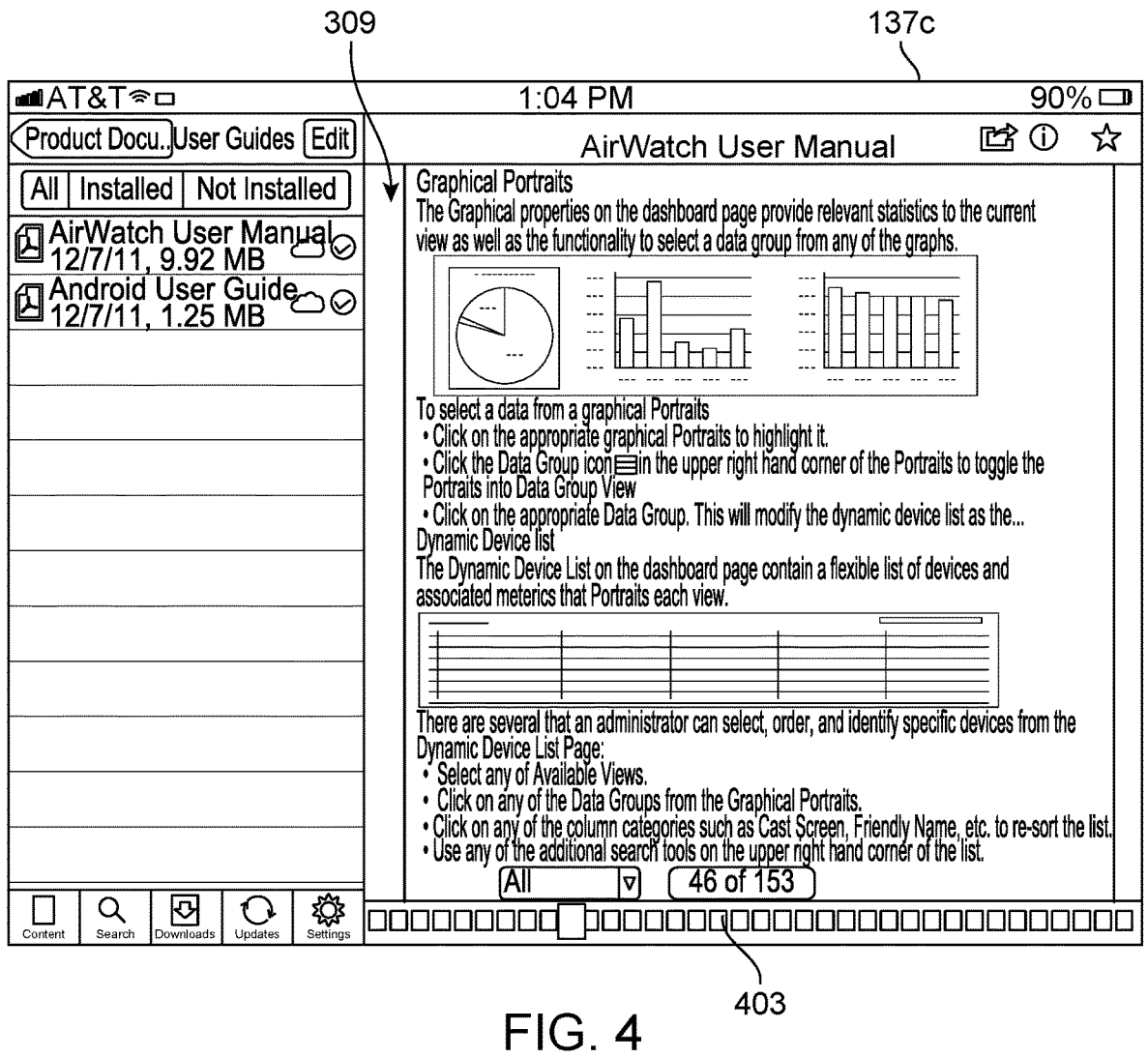

Next, a exemplary set of user interfaces is discussed in connection with FIGS. 2-7, depicting user interfaces that may be displayed as a client device requests access to the distribution server 150 and receives any available resources 165, if appropriate. In one embodiment, the user interfaces 137 depicted in FIGS. 2-4 are generated by the distribution service 174 (FIG. 1) and rendered by the client side application 126 (FIG. 1) on the display 136 (FIG. 1) of the client device 120 (FIG. 1). In another embodiment, the user interfaces 137 depicted in FIGS. 2-4 are generated and rendered by the client side application 126 on the display 136. The graphical elements and components that comprise user interfaces 137 of FIGS. 2-4 are presented by way of example only. Other approaches for presenting the content depicted in the exemplary user interfaces 137 and/or for presenting other content for implementing the subject matter described herein will be readily appreciated by those skilled in the art.

FIG. 2 is an example of a log-in interface 137*a*, according to certain embodiments of the present disclosure. The exemplary log-in interface 137*a* allows a user to provide user credentials 132 (FIG. 1) in order to request access to the distribution server 150. For example, the log-in interface 137*a* may include a group ID field 201, a username field 203, a password field 206, a work offline switch 209, and a login button 213. The user may provide one or more resource grouping identifiers 154 (FIG. 1) in the group ID field 201, user credentials 132 in the username field 203, and a password in the password field 206. Additionally, the user may optionally elect whether to access the distribution server 150 via an offline mode by activating the work offline switch 209. For example, the user may wish to access the resources 165 that have been previously stored locally on the client device 120, without establishing a current connection to the distribution service 174. Invoking the login button 213 transmits a request 177 (FIG. 1) to access the distribution server 150. In one embodiment, the client side application 126 transmits the request 177 that may include the user credentials 132, a device identifier 135 of the client device 120, and a device profile 123 of the client device 120, as discussed above. As will be appreciated, the client side application 126 may be configured to access the device identifier 135 (FIG. 1) and device profile 123 (FIG. 1) from the data store 122.

FIG. 3 is an example of a browsing interface 137*b*, according to certain embodiments of the present disclosure. The exemplary browsing interface 137*b* provides functionality for browsing resources 165 (FIG. 1) accessible to the client device 120. In his example, the browsing interface 137*b* includes a content navigation area 303, an interface navigation area 306, and a content viewing area 309. The content navigation area 303 may include a plurality of navigation controls to browse through the available resources 165 provided to the user. As an example, the navigation controls may permit the user to browse "all content," "new content," recent activity," "favorites," and/or browse by a category. For example, resources 165 available to the user and client device 120 may be accessible through one or more of the navigation controls based on a plurality of resource qualifiers 172 (FIG. 1) associated with each of the respective resources 165. The resource qualifier may indicate that the respective resource 165 is marked as a "favorite," for instance.

Additionally, the interface navigation are 306 may include a plurality of navigation controls to navigate through the interface generated by the distribution service 174. For instance, the navigation controls may include a "content" button, a "search" button, a "downloads" button, an "updates" button, and a "settings" button. In one embodiment, invoking the "content" button may transmit a request to the distribution service 174 to view all and/or a portion of the resources 165 available to the client device 120. Invoking the "search" button may transmit a request to the distribution service 174 to search the data store 153 for a specific resource 165. For instance, the user may be able to search by a name, genre, type, category, creation date, owner, and/or any other aspect of the resource 165. Invoking the "downloads" button may transmit a request to the distribution service 174 to view and/or otherwise access all previously downloaded resources 165 (e.g., previously downloaded by the current client device 120 or by other client devices operated by the user). In another embodiment, invoking the "downloads" button may also transmit a request to the distribution service 174 to download any resources 165 made available to the user. Invoking the "updates" button may transmit a request to the distribution service 174 to view and/or otherwise access available updates for the client side application 126. Additionally, invoking the "settings" button may transmit a request to the distribution service 174 to view, change, and/or otherwise access any settings and/or preferences associated with the client side application 126.

The content viewing area 309 may include a viewing area viewing, accessing, manipulating, editing, executing, consuming, and/or otherwise using the resource 165 provided by the distribution service 174. In one embodiment, the resources may be automatically received from the distribution server 150 and made available for the user in the content viewing area 309. For example, the distribution service 174 may automatically transmit a resource 165 to the client device 120 based on one or more resource qualifiers, as discussed above. In another embodiment, the user may be presented with a download button to transmit a request to download a resource 165 made available by the distribution service 174. For example, the distribution service 174 may provide a resource 165 to be available upon a download request by the user of the client device 120 based on one or more resource qualifiers, as discussed above.

FIG. 4 is another example of a user interface 137, denoted herein as user interface 137c, according to certain embodiments of the present disclosure. The exemplary user interface 137c depicts a resource 165 (FIG. 1) displayed in the content viewing area 309. For instance, the resource 165 may be a document comprising a plurality of pages that may be navigated using a resource navigation panel 403. In one embodiment, the resource 165 displayed in the content viewing area 309 may be edited by the user, saved locally, saved on a removable drive, saved on a loud device, emailed, transmitted via a social network, and/or otherwise manipulated using tools and functions provided by the client side application 126 (FIG. 1). Additionally, the distribution rules 171 associated with the displayed resource 165 may regulate whether the resource 165 may be manipulated, as discussed above. For instance, the distribution rules 171 may prevent the resource 165 from being edited, emailed and/or transmitted via a social network.

Figure 5:
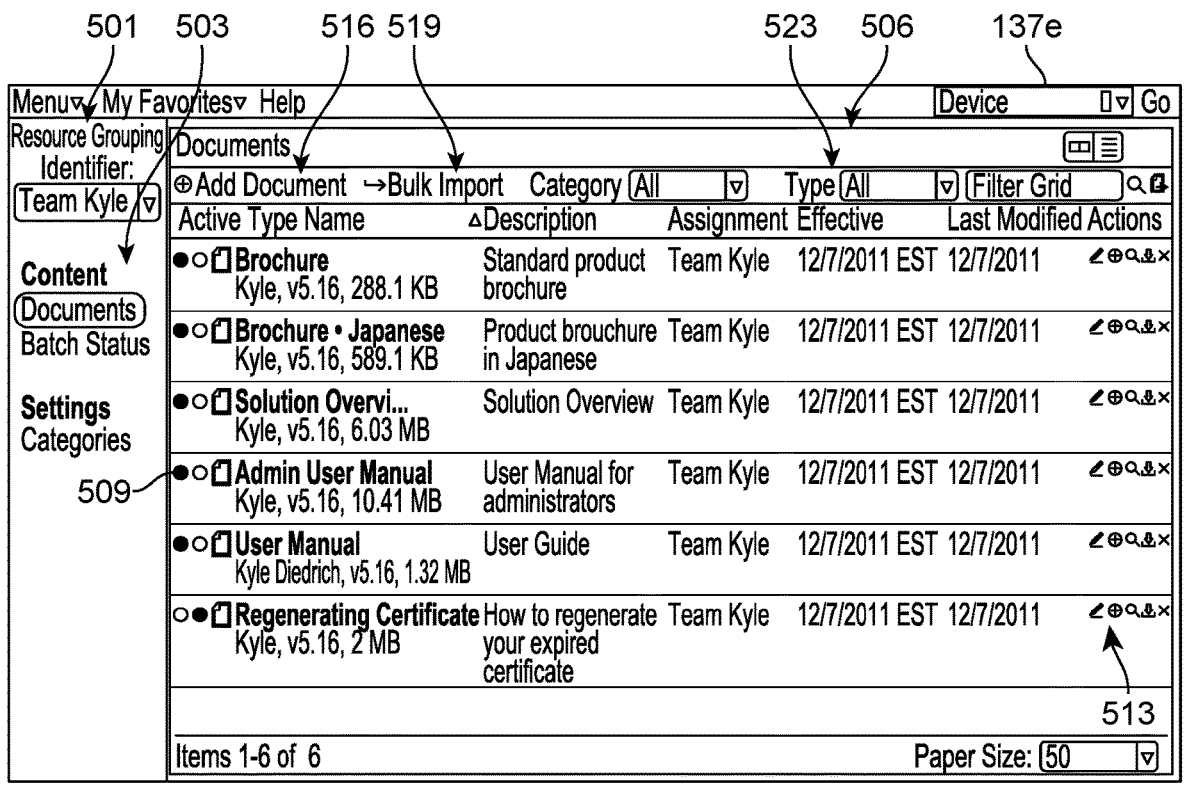

Next, a exemplary set of user interfaces is discussed in connection with FIGS. 5-7, depicting user interfaces that may be displayed for a user managing resources 165 (FIG. 1) hosted by the distribution server 150 (FIG. 1). In one embodiment, the user interfaces 137 depicted in FIGS. 5-7 are generated by the distribution service 174 (FIG. 1) and rendered by the client side application 126 (FIG. 1) and/or a browser on the display 136 (FIG. 1) of the client device 120 (FIG. 1). In another embodiment, the user interfaces 137 depicted in FIGS. 5-7 are generated and rendered by the client side application 126 and/or a browser on the display 136. The graphical elements and components that comprise user interfaces 137 of FIGS. 5-7 are presented by way of example only. Other approaches for presenting the content depicted in the exemplary user interfaces 137 and/or for presenting other content for implementing the subject matter described herein will be really appreciated by those skilled in the art.

FIG. 5 is an example of a landing interface 137c for an administrator of the distribution server 150, according to certain embodiments of the present disclosure. The exemplary landing interface 137e includes a resource group indicator 501 navigation area 503 and a documents area 506. In one embodiment, the resource group indicator 501 may depict a resource grouping identifier 154 (FIG. 1) currently being managed. As an example, user interface 137e depicts the resources 165 associated with the resource grouping identifier 154 called "Team Kyle." A drop-down button may be associated with the resource group indicator 501 for managing resource 165 associated with other resource grouping identifiers 154. The navigation area 503 may include a plurality of navigation controls that permit the user to manage the content hosted by the distribution server 150 that is associated with the resource grouping identifier 154 depicted by the resource indicator 501. For example, the navigation controls may include a plurality of buttons, such as a "documents" button, to manage resources 165 associated with the "Team Kyle" resource grouping identifier 154.

Additionally, the documents area 506 includes a listing of resources 165 that are associated with the resource grouping identifier 154 depicted by the resource indicator 501. In one embodiment, the resources 165 may be presented in a table 509 where each row in the table includes identifying information for each of the respective resources 165. For instance, the table may include a name of the resource 165, a type of the resource 165, a brief description of the resource 165, an owner of the resource 165, an effective date of the resource 165, and a date of last modification of the resource 165. Additionally, a plurality of management buttons 513 may be presented for each resource 165. For instance, the management buttons 513 may permit the administrator to edit the resource qualifiers associated with the resource 165, add version information, view a listing of resource grouping identifiers 154 with access to the respective resource 165, download a copy of the resource 165, and remove the resource 165 from being hosted by the distribution server 150.

In one embodiment, the documents area 506 may also include an "add document" button 516, a "bulk import" button 519, and sorting options 523. For instance, invoking the "add document" button 516 may transmit a request to the distribution service 174 to add new resources 165 to be hosted by the distribution server 150, as will be described with respect to FIGS. 6 and 7. Additionally, invoking the "bulk import" button 519 may transmit a request to the distribution service 174 to simultaneously add and/or import a plurality of resources 165, as can be appreciated. Further, the sorting options 523 may include a plurality of options for the administrator to transmit a request to sort the resources 165 presented in the table 509, such as according to a resource category, a resource type and/or any other sorting option.

FIG. 6 is an example of a user interface 137f that allows an administrator to add a new resource 165 to be hosted by the distribution server 150, according to certain embodiments of the present disclosure. For instance, the user interface 137f includes a grouping field 603, a resource field 606, an upload button 609, and a continue button 613. In one embodiment, the administrator may provide one or more resource grouping identifiers 154 (FIG. 1), in the grouping field 603, the permit users and client devices to access the new resource 165 to be added. Additionally, an administrator may indicate a location of the new resource 165 to be added in the resource field 606. For example, the administrator may specify the location of the new resource 165 to be added as residing on a Share Point, a cloud storage account, and/or any other storage system accessible to the client device 120 and/or the distribution server 150. Invoking the upload button 609 transmits a request to the distribution service 174 to upload the resource 165 specified in the resource field 606 and to associate it with the resource grouping identifiers 154 specified in the grouping field 603. Invoking the continue button 613 may transmit a request to the distribution service 174 to advance to another user interface 137, such as the interface described with respect to FIG. 7.

FIG. 7 is an example of a user interface 137g that allows an administrator to specify distribution rules 171 for a resource 165, according to certain embodiments of the present disclosure. In one embodiment, the user interface 137g includes a rules navigation panel 703, a rules specification area 706, a save button 709, and a reset button 713. The rules navigation panel 703 may include a plurality of tabs for specifying various types of distribution rules 171. For example, the tabs may include an "information" tab for providing general information related to the resource 165, a "details" tab for providing specific details related to the resource 165, a "previous versions" for providing distribution rules 171 related to a previous version of the resource 165, a "security" tab for providing security measures such as encryption and/or write capability for the resource 165, an "assignment" tab for providing ownership criteria related to the resource 165, and a "deployment" tab for specifying whether the resource 165 will be made available for download or automatically transmitted to user upon request. Activation of each tab will change the user interface 137g to display fields, buttons, menus, and/or other components for inputting the appropriate details.

In one embodiment, invoking one of the tabs in the navigational panel 703 may transmit a request to the distribution server 150 to specify distribution rules 171 associated with the respective type. As shown in FIG. 7, the rules specification area 706 depicts a plurality of fields for specifying distribution rules 171 related to the information tab. For example, the fields in the rules specification area 706 may include a field for specifying a name, a location, a version, a description, an importance level, a resource grouping identifier 154, and/or any other information related to the new resource 165. Additionally, invoking the save button 709 may transmit a request to the distribution service 174 to save the distribution rules 171 specified via the user interface 137g. Invoking the reset button 713 may transmit a request to the distribution service 174 to reset the distribution rules 171 associated with a particular resource.

Figure 8:
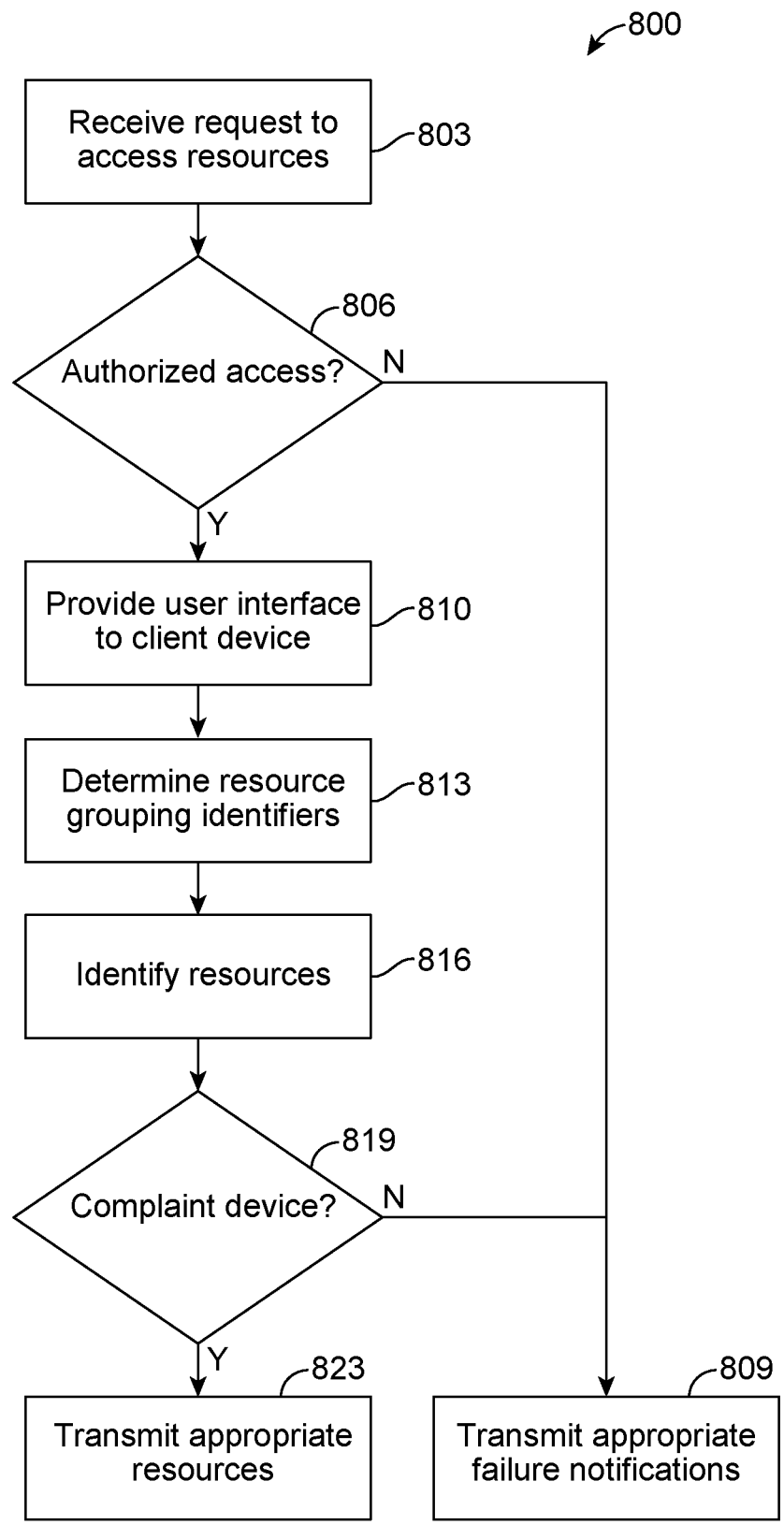
FIG. 8 is a flowchart illustrating exemplary functionality performed by a distribution service executed by a distribution server in the networked environment of FIG. 1 according to certain embodiments of the present disclosure.

FIG. 8 is a flowchart illustrating exemplary functionality performed by the distribution service 174 according to certain embodiments. It is understood that the flowchart of FIG. 8 provides merely an example of the many different types of functional arrangements that may be employed to implement the operation of the distribution service 174 as described herein. As an alternative, the flowchart of FIG. 8 may be viewed as depicting an example of steps of a method implemented in the distribution server 150 (FIG. 1) according to one or more embodiments.

Beginning with step 803, the distribution service 174 receives a request 177 (FIG. 1) from a client device 120 to access resources 165 (FIG. 1) hosted by the distribution server 150. In one embodiment, the request 177 may include a device identifier 135 (FIG. 1) associated with the client device 120 and user credentials 132 (FIG. 1) of the user operating the client device 120. In another embodiment, the request 177 may additionally include a device profile 123 (FIG. 1) and/or information related to the device profile 123 that describes a state of the client device 120.

Next, in step 806, the distribution service 174 determines whether the client device 120 and the user operating the client device 120 are authorized to access the resources 165 hosted by distribution service 174. In one embodiment, the distribution service 174 may authorize the user and client device 120 pairing according to the approach described in application Ser. No. 13/316,073 entitled "CONTROLLING ACCESS TO RESOURCES ON A NETWORK," as described above. If the distribution service 174 determines that the user may not access the resources 165 from the client device 120, then the distribution server advances to step 809 and notifies the user. For instance, the distribution service 174 may transmit a notification indicating that the user is not authorized to access the resources 165 from the client device 120.

Returning to step 806, if the distribution service 174 determines that the user is authorized to access the resources 165, then the distribution service 174 proceeds to step 810 and provides a user interface 137 (FIG. 1) to the client device 120. For instance, the distribution server 174 may provide a browsing interface 137b as shown in FIG. 3 to the client device 120. Then, in step 813, the distribution service 174 determines the resource grouping identifiers 154 of the resources 165 accessible by the user from the client device 120. In one embodiment, the distribution service 174 determines the resource grouping identifiers 154 based the user credentials 132 of the user and the device identifier 135 of the client device 120. For instance, each resource grouping identifier 154 may be associated with a pairing of user credentials 132 and a device identifier 135. The distribution service 174 may determine one or more resource grouping identifiers 154 associated with the pairing of user credentials 132 and the device identifier 135, as described above.

Then, in step 816, the distribution service 174 identifies the resources 165 that are associated with the determined resource grouping identifiers 154. In one embodiment, each resource 165 may be associated with more than one resource grouping identifier 154. Additionally, each resource grouping identifier 154 may have an association with more than one resource 165, as described above. Upon identifying all of the resources 165 associated with the determined resource grouping identifiers 154, the distribution service 174 proceeds to step 819 and determines whether the client device 120 from which the request 177 was received complies with the distribution rules 171 associated with each one of the identified resources 165. In one embodiment, the distribution service 174 determines whether the client device 120 is compliant based on the device profile 123 associated with the client device 120. For instance, the distribution service 174 may have received the device profile 123 in conjunction with the request 177.

If the distribution service 174 determines that the client device 120 does not comply with any of the distribution rules 171 associated with each one of the resources 165, then the distribution service 174 proceeds to step 809 and transmits a notification of noncompliance to the client device 120. In one embodiment, the distribution service 174 may determine that the client device 120 complies with the distribution rules 171 of a portion of the identified resources 165. In this example, the distribution service 174 may transmit a notification of noncompliance to the client device 120 that includes a name of the identified resources 165 and a message that the client device 120 is not authorized to receive due to noncompliance with the distribution rules 171 associated with the identified resource 165.

Returning to step 819, if the distribution service 174 determines that the client device 120 complies with the distribution rules 171 of all and/or a portion of the identified resources 165, the distribution service proceeds to step 823 and transmits the identified resources 165 associated with the distribution rules 171 with which the client device is in compliance. In one embodiment, the distribution service 174 automatically transmits the identified resources 165 that the client device 120 is authorized to receive based on compliance with distribution rules 171. In another embodiment, the distribution service 174 may make available for download the identified resources 165 that the client device 120 is authorized to receive. For instance, the client device 120 may receive an indication that the resource 165 is available for download and may transmit a request to the distribution service 174 for downloading the applicable resource 165. Upon receiving the request, the distribution service 165 may transmit the resource 165 to the client device 120. Additionally, in another embodiment, the distribution rules 171 associated with the transmitted resources 165 may be transmitted in conjunction with the resources 165. For instance, a client side application 126 (FIG. 1) on the client device 120 may periodically determine whether the client device 120 remains compliant to access the received resources 165, as deserted above.

Figure 9:
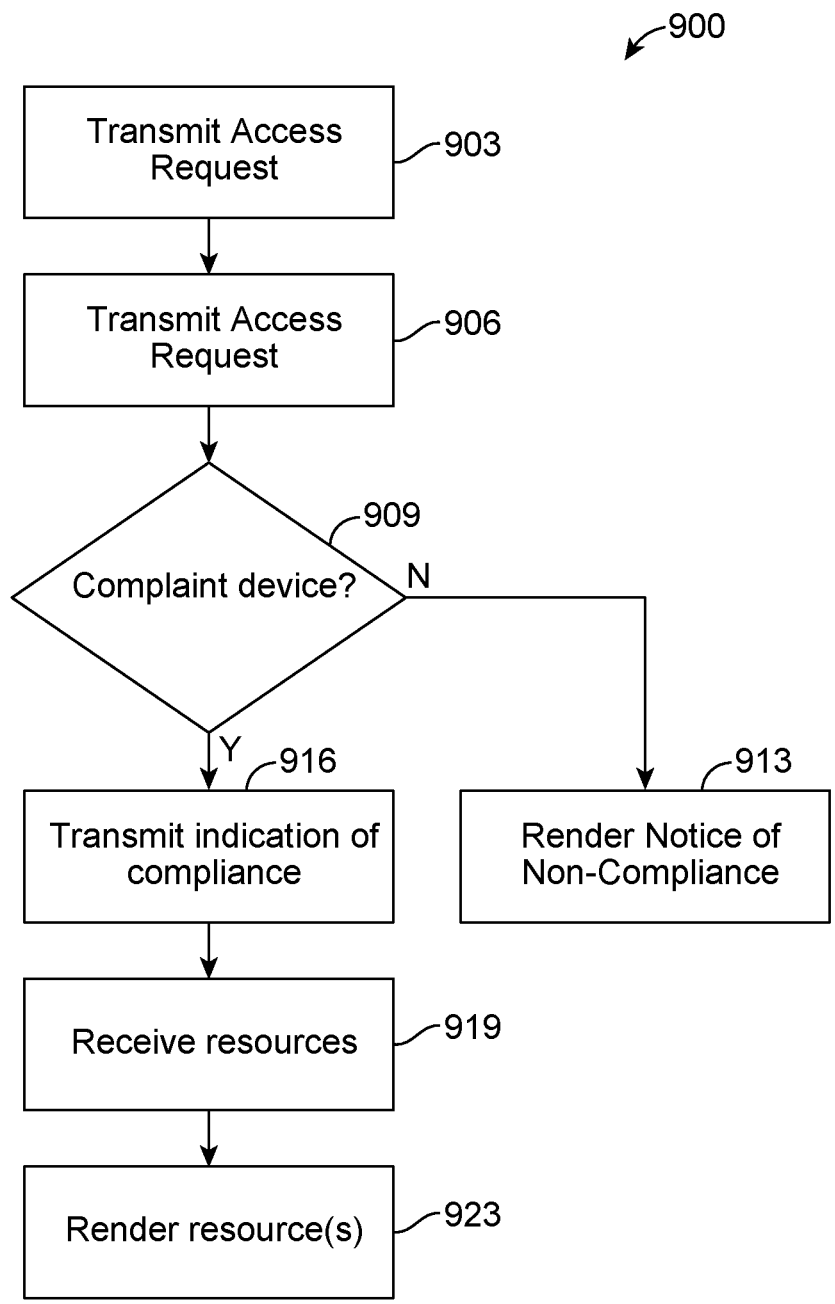
FIG. 9 is a flowchart illustrating exemplary functionality performed by a client side application in the networked environment of FIG. 1 according to certain embodiments of the present disclosure.

FIG. 9 is a flowchart illustrating exemplary functionality performed by a client side application 126 according to certain embodiments. It is understood that the flowchart of FIG. 9 provides merely an example of the many different types of functional arrangements that may be employed to implement the operation of the client side application 126 as described herein. As an alternative, the flowchart of FIG. 9 may be viewed as depicting an example of steps of a method implemented in the client device 120 (FIG. 1) according to one or more embodiments Beginning with step 903, the client side application 126 transmits a request 177 (FIG. 1) to the distribution service 174 (FIG. 1) to access resources 165 (FIG. 1). In one embodiment, the client side application 126 may include user credentials 132 (FIG. 1) of a user and a device identifier 135 of the client device 120 in conjunction with the request 177, for instance, the client side application 126 may prompt the user of the client device 120 to provide the user credentials 132 for requesting the access and may access the device identifier 135 from a local data store 122 or from the device hardware of the client device 120.

Then, in step 906, the client side application 126 receives a plurality of sets distribution rules 171 from the distribution server 150. In one embodiment, the client side application 126 may receive the sets of distribution rules 171 if the user and the client device 120 are authorized to access the resources 165. For instance, the user and the client device 120 may be authorized based on the user credentials 132 and the device identifier 135 transmitted in conjunction with the request 177. In addition, each of the received sets of distribution rules 171 may be associated with one of a plurality of resources 165 that are determined to be accessible to the user and the client device 120. For instance, the resources 165 accessible to the user and the client device 120 may be determined based on a plurality of resource grouping identifiers 154 (FIG. 1), wherein the resource grouping identifiers 154 are determined based on the user credentials 132 of the user and the device identifier 135 of the client device 120, as described above.

Upon receiving the distribution rules 171, the client side application 126, in step 909, determines whether the client device 120 is compliant with the sets of distribution rules 171 associated with the resources 165 accessible to the user and client device pairing. In one embodiment, the client side application 126 may determine whether the client device 120 is compliant with the sets of distribution rules 171 based on the device profile 123 (FIG. 1) of the client device 120, as described above. If the client side application 126 determines that the client device 120 is not compliant with a portion and/or all of the sets of distribution rules 171, then the client side application 126 proceeds to step 913 and renders a notice of non-compliance on a display 136 (FIG. 1) of the client device 120. In one embodiment, the notice may identify a plurality of resources 165 associated with the sets of distribution rules 171 that resulted in the non-compliance. Additionally, if the client side application 126 determines that the client device 120 is not compliant with any of the sets of distribution rules 171, the client side application may transmit a notification to the distribution service 174 indicating that the client device 120 is non-compliant.

Returning to step 909, if the client side application 126 determines that the client device 120 is compliant with all and/or a portion of the sets of distribution rules 171, then the client side application 126 proceeds to step 916 and transmits an notification of compliance to the distribution service 174. In one embodiment, if the client side application 126 determines that the client device 120 is compliant with only a portion of the sets of distribution rules 171, then the notification may include an indication of the sets of distribution rules 171 with which the client device 120 complies.

Then, in step 919, the client side application 126 receives the resources 165 associated with the distribution rules 171 with which the client device 120 complies. In one embodiment, the resources 165 may be automatically received by the client device 120. In another embodiment, the client side application 126 may receive an indication that the resources 165 are available for download. In step 923, the received resources 165 are rendered on the display 136. In one embodiment, the client side application 126 may render a notification to the user that the resources 165 are available for download. Then, upon receiving a request from the user to download the resources 165, the client side application 126 may download the resources 165 from the distribution server 150 and render the downloaded resources 165 on the display 136.

Figure 10:
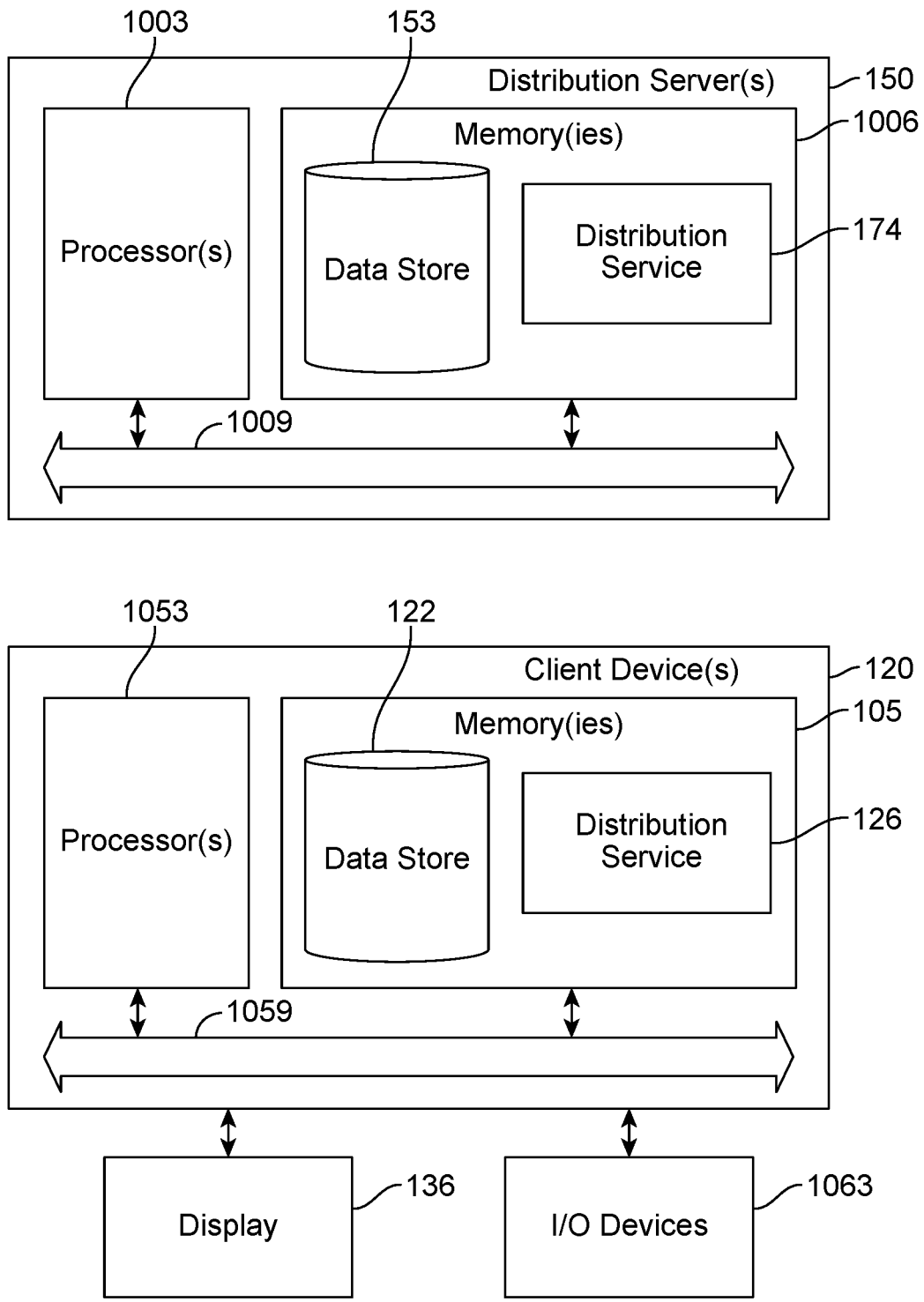
FIG. 10 shows schematic block diagrams illustrating a distribution server and client device employed in the networked environment of FIG. 1 according to certain embodiments of the present disclosure.

FIG. 10 shows schematic block diagrams of an exemplary distribution server 150 and an exemplary client device 120 according to an embodiment of the present disclosure. The distribution server 150 includes at least one processor circuit, for example, having a processor 1003 and a memory 1006, both of which are coupled to a local interface 1009. To this end, the distribution server 150 may comprise, for example, at least one server computer or like device. Similarly, the client device 120 includes at least one processor circuit, for example, having a processor 1053 and a memory 1056, both of which are coupled to a local interface 1059. Additionally, the client device 120 may be in data communication with a display 136 for rendering user interfaces 137 (FIG. 1) and one or more other I/O devices 1063 for inputting and outputting data. To this end, the client device 120 may comprise, for example, at least one client computer or like device.

The following is a general discussion of the components of the distribution server 150 and the client device 120. The local interface 1009 and 1059 may comprise, for example, a data bus with an accompanying address/control bus or other bus structure as can be appreciated. Stored in the memory 1006 and 1056 are both data and several components that are executable by the processors 1003 and 1053. In particular, will regard to the distribution server 150, stored in the memory 1006 and executable by the processor 1003 are a distribution service 174 and potentially other applications. Additionally, with regard to the client device 120, stored in the memory 1056 and executable by the processor 1053 are a client side application 126 and potentially other applications. Also stored in the memory 1006 and 1056 may be a data store 153 and 122 and other data. In addition, an operating system may be stored in the memory 1006 and 1056 and executable by the processor 1003 and 1053.

It is to be understood that there may be other applications that are stored in the memory 1006 and 1056 and are executable by the processor 1003 and 1053 as can be appreciated. Where any component discussed herein is implemented in the form of software, any one of a number of programming languages may be employed such as, for example, C, C++, C #, Objective C, Java, Javascript, Perl, PHP, Visual Basic, Python, Ruby, Delphi, Flash, or other programming languages.

A number of software components are stored in the memory 1006 and 1056 and are executable by the processor 1003 and 1053. In this respect, the term "executable" means a program file that is in a form that can ultimately be run by the processor 1003 and 1053. Examples of executable programs may be, for example, a compiled program that can be translated into machine code in a format that can be loaded into a random access portion of the memory 1006 and 1056 and run by the processor 1003 and 1053, source code that may be expressed in proper format such as object code that is capable of being loaded into a random access portion of the memory 1006 and 1056 and executed by the processor 1003 and 1053, or source code that may be interpreted by another executable program to generate instructions in a random access portion of the memory 1006 and 1056 to be executed by the processor 1003 and 1053, etc. An executable program may be stored in any portion or component of the memory 1006 and 1056 including, for example, random access memory (RAM), read-only memory (ROM), hard drive, solid-state drive, USB flash drive, memory card, optical disc such as compact disc (CD) or digital versatile disc (DVD), floppy disk, magnetic tape, or ether memory components.

The memory 1006 and 1056 are defined herein as including both volatile and nonvolatile memory and data storage components. Volatile components are those that do not retain data values upon loss of power. Nonvolatile components are those that retain data upon a loss of power. Thus, the memory 1006 and 1056 may comprise, for example, random access memory (RAM), read-only memory (ROM), hard disk drives, solid-state drives, USB flash drives, memory cards accessed via a memory card reader, floppy disks t accessed via an associated floppy disk drive, optical discs accessed via an optical disc drive, magnetic tapes accessed via an appropriate tape drive, and/or other memory components, or a combination of any two or more of these memory components. In addition, the RA M may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 end 1053 present multiple processors, and the memory 1006 and 1056 may represent multiple memories that operate in parallel processing circuits, respectively. In such a case, the local interface 1009 end 1059 may be an appropriate network 110 (FIG. 1) that facilitates communication between any two of the multiple processor 1003 and 1053, or between any two of the memory 1006 and 1056, etc. The local interface 1009 and 1059 may comprise additional systems designed to coordinate this communication, including, for example, performing load balancing. The processor 1003 and 1053 may be of electrical or of some other available construction.

Although the distribution service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8 and 9 show certain functionality and operations performed by the distribution service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 and 1053 in a computer system or other system. The machine code may be converted from the source code, etc. If embodied in hardware, each block may represent a circuit or e number of interconnected circuits to implement the specified logical function(s).

Although the flowcharts of FIGS. 8 and 9 show a specific order of execution, it is understood that the order of execution may differ from that which is depicted. For example, the order of execution of two or more steps may be scrambled relative to the order shown. Also, two or more blocks shown in succession in FIGS. 8 and 9 may be executed concurrently or with partial concurrence. Further, in some embodiments, one or more of the steps shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the distribution service 174 and the client side application 126, that comprises software or code can be embodied in any non-transitory computer-readable medium for use by or in connection with an instruction execution system such as, for example, a processor 1003 and 1053 in a compute system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for modifying securely managed resources comprising:
   at least one memory; and
   a client device in communication with the at least one memory, the client device configured to at least:
   transmit a request to access a distribution service associated with a plurality of resources;
   receive at least one resource selected from the plurality of resources for provisioning to the client device;
   receive at least one distribution rule associated with the at least one resource;
   determine, for the at least one resource, whether the client device complies with the at least one distribution rule associated with the at least one resource;
   determine whether the at least one resource was modified on the client device to generate a modified at least one resource;
   responsive to the at least one resource being modified, store the modified at least one resource in the at least one memory accessible to the client device;
   send a request to the client device to transmit the modified at least one resource to the distribution service; and
   cause the modified at least one resource to be transmitted to the distribution service.

2. The system of claim 1, wherein the at least one resource is selected by the distribution service by at least:
   identifying at least one resource grouping identifier associated with the client device or a user of the client device; and
   identifying, based at least in part on the identified at least one resource grouping identifier, at least one particular resource associated with the at least one resource grouping identifiers.

3. The system of claim 1, wherein the client device is further configured to at least:
   determine that the at least one distribution rule requires additional authorization to access the at least one resource; and
   render a prompt for additional authorization credentials via a display associated with the client device.

4. The system of claim 1, wherein the client device is further configured to at least determine, on a periodic basis, whether the at least one resource was modified.

5. The system of claim 1, wherein the client device is further configured to at least:
   store the at least one distribution rule associated with the at least one resource in the at least one memory;
   transmit a second request to access the distribution service associated with the plurality of resources; and
   transmit an indication to the distribution service that the client device complies with the at least one distribution rule stored in the at least one memory.

6. The system of claim 1, wherein the client device is further configured to at least render the at least one resource via a display associated with the client device.

7. The system of claim 1, wherein the client device is further configured to at least determine whether the client device and a user account associated with the client device are authorized to access the at least one resource, wherein the at least one distribution rule is received responsive to the client device and the user account being authorized to access the at least one resource.

8. A method comprising:
   transmitting, by a client device, a request to access a distribution service associated with a plurality of resources;
   receiving, by the client device, at least one resource selected from the plurality of resources for provisioning to the client device;
   receiving, by the client device, at least one distribution rule associated with the at least one resource;
   determining, by the client device, for the at least one resource, whether the client device complies with the at least one distribution rule associated with the at least one resource;
   determining, by the client device, whether the at least one resource was modified on the client device to generated a modified at least one resource;
   in response to the at least one resource being modified and complying with the at least one distribution rule, storing, by the client device, the modified at least one resource in a memory accessible to the client device;
   sending, by the client device, a request to the client device to transmit the modified at least one resource to the distribution service; and
   causing, by the client device, the modified at least one resource to be transmitted to the distribution service.

9. The method of claim 8, wherein the at least one resource is selected by the distribution service by at least:
   identifying at least one resource grouping identifier associated with the client device or a user of the client device; and
   identifying, based at least in part on the identified at least one resource grouping identifier, at least one particular resource associated with the at least one resource grouping identifiers.

10. The method of claim 8, further comprising:
    determining, by the client device, that the at least one distribution requires additional authorization to access the at least one resource; and rendering, by the client device, a prompt for additional authorization credentials via a display associated with the client device.

11. The method of claim 8, further comprising periodically determining, by the client device, whether the at least one resource was modified.

12. The method of claim 8, further comprising:
storing, by the client device, the at least one distribution rule associated with the at least one resource in the memory;
transmitting, by the client device, a second request to access the distribution service associated with the plurality of resources; and
transmitting, by the client device, an indication to the distribution service that the client device complies with the at least one distribution rule stored in the memory.

13. The method of claim 8, further comprising rendering, by the client device, the at least one resource via a display associated with the client device.

14. The method of claim 8, further comprising determining, by the client device, whether the client device and a user account associated with the client device are authorized to access the at least one resource, wherein the at least one distribution rule is received responsive to the client device and the user account being authorized to access the at least one resource.

15. A non-transitory computer-readable medium embodying a program that, when executed by a client device, causes the client device to at least:
transmit a request to access a distribution service associated with a plurality of resources;
receive at least one resource selected from the plurality of resources for provisioning to the client device;
receive at least one distribution rule associated with the at least one resource;
determine for the at least one resource, whether the client device complies with the at least one distribution rule associated with the at least one resource;
determine whether the at least one resource was modified on the client device to generated a modified at least one resource;
responsive to the at least one resource being modified, store the modified at least one resource in a memory accessible to the client device;
send a request to the client device to transmit the modified at least one resource to the distribution service; and
cause the modified at least one resource to be transmitted to the distribution service.

16. The non-transitory computer-readable medium of claim 15, wherein the at least one resource is selected by the distribution service by at least:
identifying at least one resource grouping identifier associated with the client device or a user of the client device; and
identifying, based at least in part on the identified at least one resource grouping identifier, at least one particular resource associated with the at least one resource grouping identifiers.

17. The non-transitory computer-readable medium of claim 15, wherein the program further causes the client device to at least:
determine that the at least one distribution requires additional authorization to access the at least one resource; and
render a prompt for additional authorization credentials via a display associated with the client device.

18. The non-transitory computer-readable medium of claim 15, wherein the program further causes the client device to at least determine, on a periodic basis, whether the at least one resource was modified.

19. The non-transitory computer-readable medium of claim 15, wherein the program further causes the client device to at least:
store the at least one distribution rule associated with the at least one resource in the memory;
transmit a second request to access the distribution service associated with the plurality of resources; and
transmit an indication to the distribution service that the client device complies with the at least one distribution rule stored in the memory.

20. The non-transitory computer-readable medium of claim 15, wherein the program further causes the client device to at least determine whether the client device and a user account associated with the client device are authorized to access the at least one resource, wherein the at least one distribution rule is received responsive to the client device and the user account being authorized to access the at least one resource.

* * * * *